(12) United States Patent
Suzuki et al.

(10) Patent No.: US 8,182,011 B2
(45) Date of Patent: May 22, 2012

(54) SLIDE DECK DEVICE FOR VEHICLE

(75) Inventors: Kenichi Suzuki, Kanagawa (JP);
Toshiro Tamura, Kanagawa (JP);
Susumu Iwasawa, Nagoya (JP);
Takehiro Masuda, Nagoya (JP)

(73) Assignees: Shiroki Corporation, Fujisawa-Shi (JP);
Hayashi Telempu Co., Ltd., Nagoya-Shi (JP)

( * ) Notice: Subject to any disclaimer, the term of this patent is extended or adjusted under 35 U.S.C. 154(b) by 0 days.

(21) Appl. No.: 12/810,677

(22) PCT Filed: Dec. 22, 2008

(86) PCT No.: PCT/JP2008/073281
§ 371 (c)(1),
(2), (4) Date: Jun. 25, 2010

(87) PCT Pub. No.: WO2009/084499
PCT Pub. Date: Jul. 9, 2009

(65) Prior Publication Data
US 2010/0283279 A1 Nov. 11, 2010

(30) Foreign Application Priority Data

Dec. 27, 2007 (JP) ................................. 2007-335841

(51) Int. Cl.
*B60R 13/01* (2006.01)
(52) U.S. Cl. ................... 296/26.09; 296/37.6; 296/37.8; 296/37.14; 296/37.16
(58) Field of Classification Search ............... 296/26.09, 296/37.6, 37.8, 37.14, 37.16; 414/522
See application file for complete search history.

(56) References Cited

U.S. PATENT DOCUMENTS

| 2,094,401 | A | * | 9/1937 | Girl | 414/462 |
| 3,028,025 | A | * | 4/1962 | White | 414/522 |
| 3,132,755 | A | * | 5/1964 | Greenslate | 414/522 |

(Continued)

FOREIGN PATENT DOCUMENTS

| JP | 2000-25526 A | 1/2000 |
| JP | 2002-87166 A | 3/2002 |
| JP | 2007-161002 A | 6/2007 |
| JP | 2008-254574 A | 10/2008 |

OTHER PUBLICATIONS

International Search Report of PCT/JP2008/073281 (Jan. 21, 2009).

*Primary Examiner* — Glenn Dayoan
*Assistant Examiner* — Gregory Blankenship
(74) *Attorney, Agent, or Firm* — Millen, White, Zelano, Branigan, P.C.

(57) ABSTRACT

This invention provides a slide deck device, for a vehicle, which prevents a slide deck from rattling with respect to a floor surface of a vehicle even if an upward load is applied to the side deck in a state where the slide deck is completely drawn into the vehicle. The slide deck device is provided with a supporting member 30 provided on a floor surface 15 and supporting an undersurface of a slide deck 20, a floor contact-member 52 provided on the floor surface, and a slide deck contact-member 60 provided on the undersurface of the slide deck. When the slide deck is located at the accommodated position, the slide deck contact-member is in contact with the undersurface of the floor contact-member.

6 Claims, 17 Drawing Sheets

U.S. PATENT DOCUMENTS

| | | | |
|---|---|---|---|
| 3,375,959 A * | 4/1968 | Hamilton | 224/484 |
| 4,824,158 A * | 4/1989 | Peters et al. | 296/37.6 |
| 5,046,913 A * | 9/1991 | Domek et al. | 414/522 |
| 5,934,725 A * | 8/1999 | Bowers | 296/26.09 |
| 6,059,339 A * | 5/2000 | Madson | 296/26.01 |
| 6,422,567 B1 * | 7/2002 | Mastrangelo et al. | 296/37.1 |
| 7,543,872 B1 * | 6/2009 | Burns et al. | 296/26.09 |
| 7,681,936 B2 * | 3/2010 | McClintock et al. | 296/37.14 |

\* cited by examiner

Fig.2
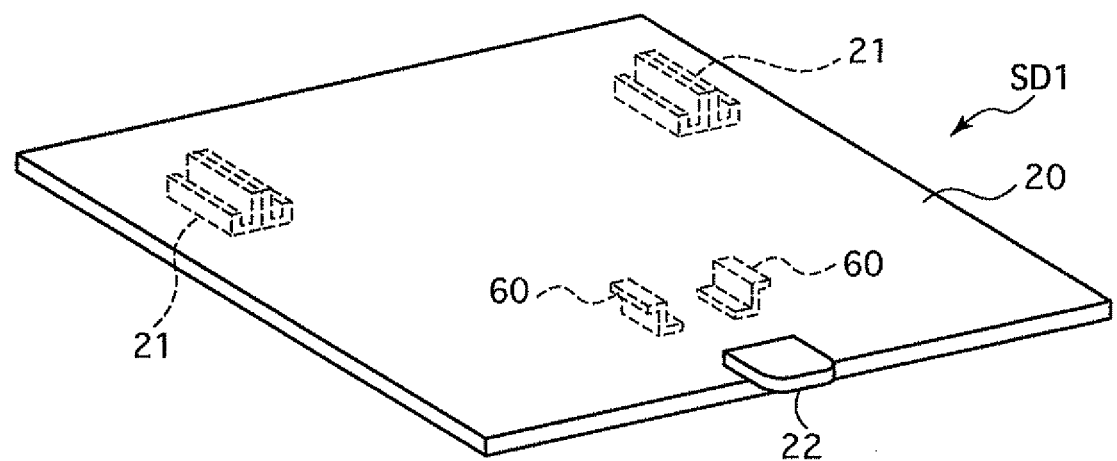
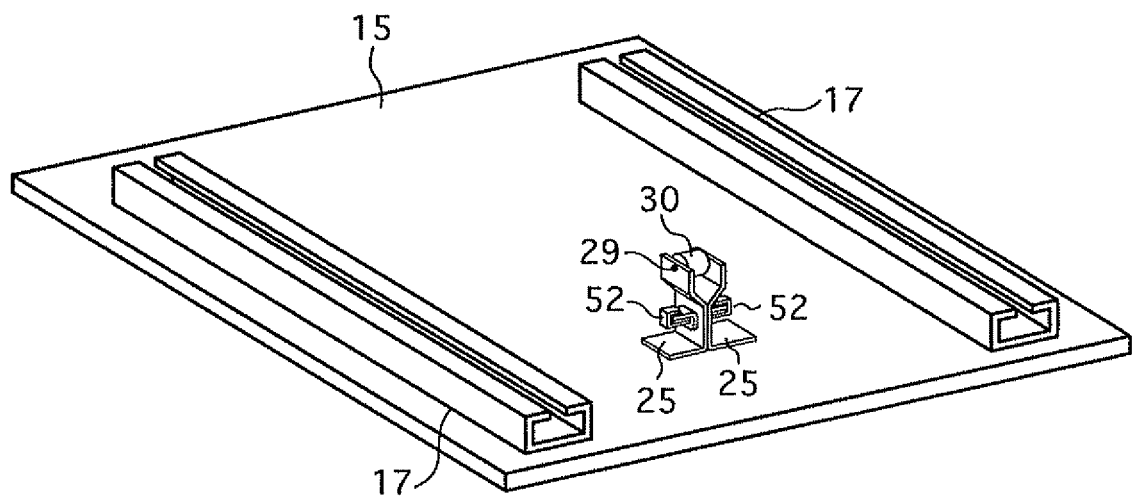
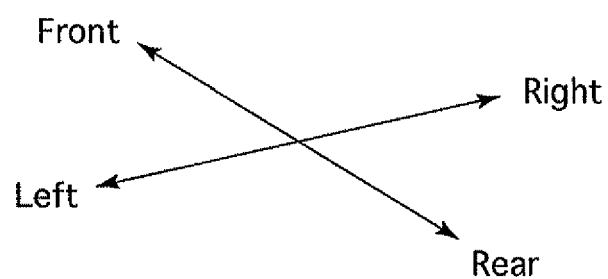

Front ← → Rear

Front ← → Rear

Fig.7
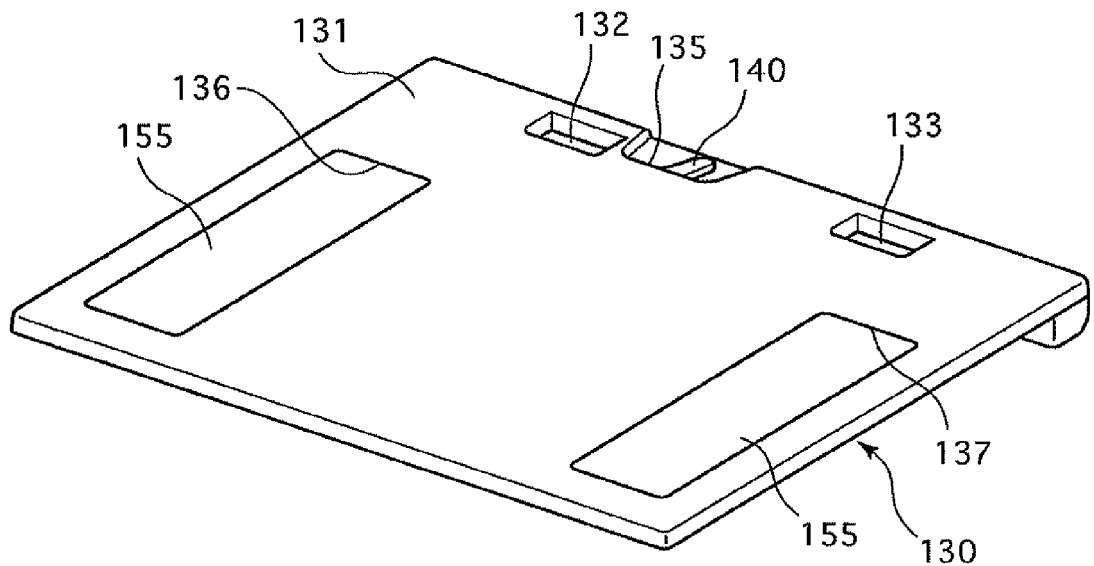
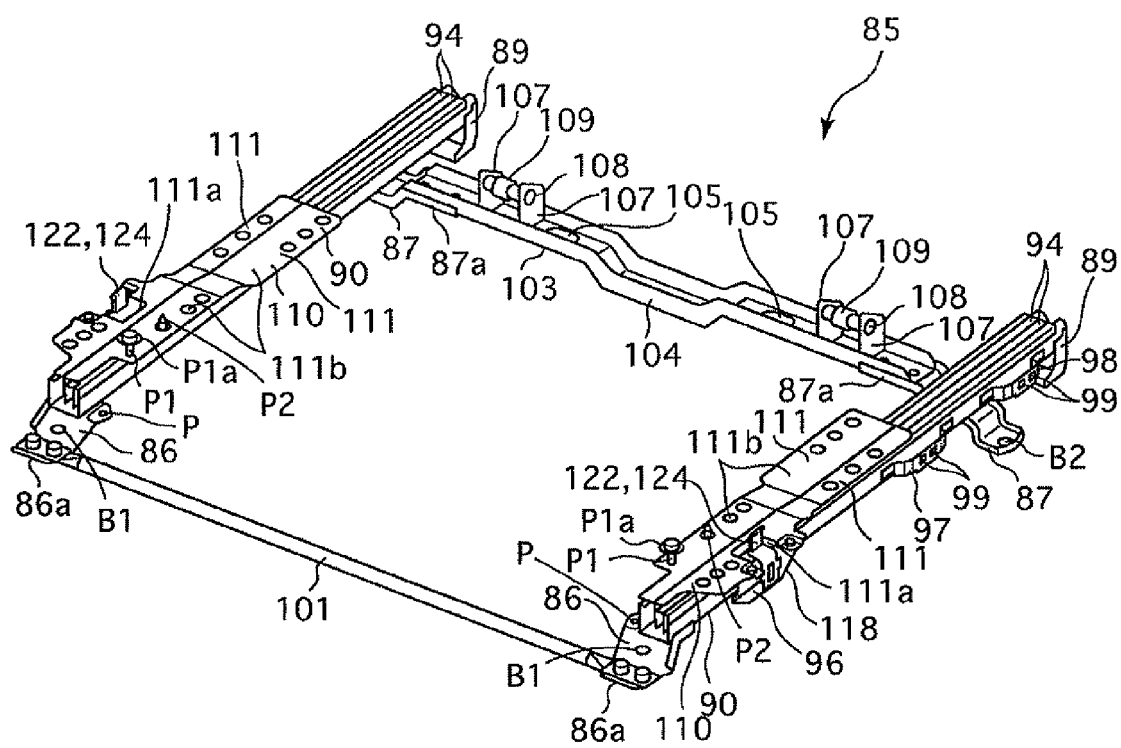

Fig.21
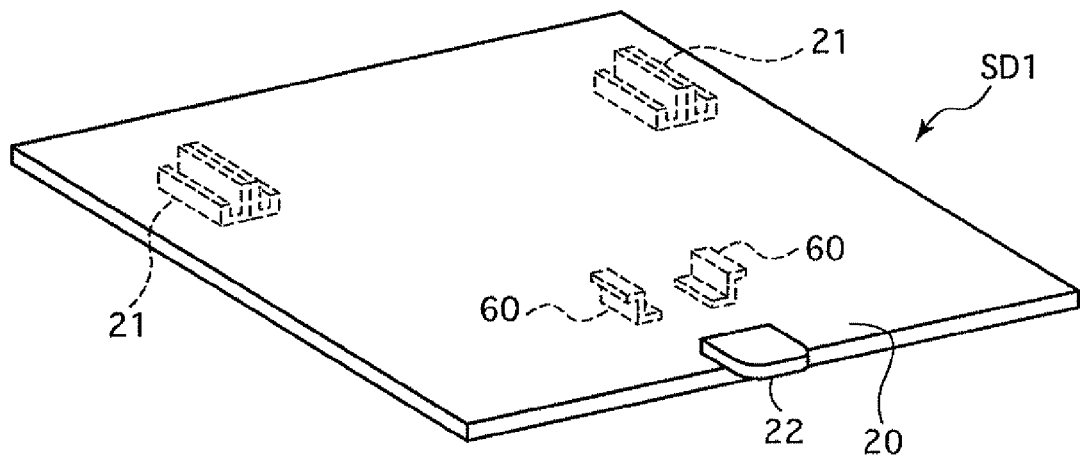
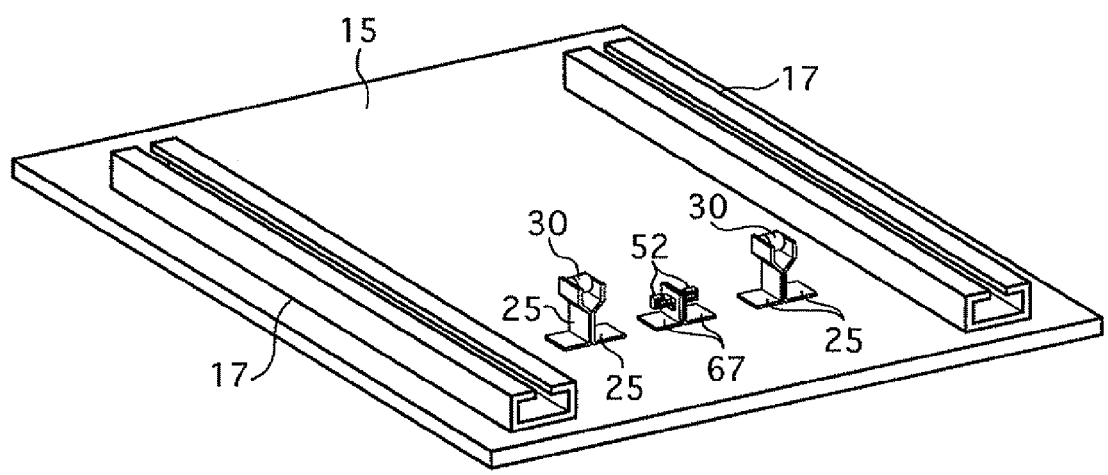
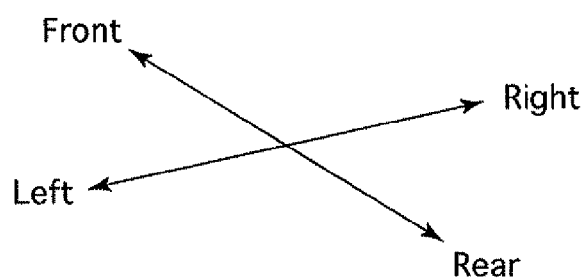

SLIDE DECK DEVICE FOR VEHICLE

TECHNICAL FIELD

The present invention relates to a slide deck device provided on a floor surface of a luggage compartment of a vehicle including a back door, and particularly relates to an uplift prevention mechanism for a slide deck.

BACKGROUND ART

Slide deck devices for a vehicle sometimes include a support roller provided at the center in the width direction (left/right direction) of a floor surface of a luggage compartment. This support roller can rotate about a rotational shaft that extends in the left/right direction and supports the center, in the width direction, of an undersurface of a slide deck (for example, see, Japanese Patent Application Laid-Open No. 2002-87166).

If the undersurface of a slide deck is supported by a support roller in this manner, it is possible to prevent the center of the slide deck from being significantly bent downward even if a heavy load is placed on the slide deck. Therefore, even if a heavy load is placed on the slide deck, the slide deck can be smoothly slid.

SUMMARY OF INVENTION

Technical Problem

When a vehicle is driven in a state that a slide deck is completely drawn into the vehicle and a back door is closed, an upward load may be applied to the slide deck by vibration, etc., during driving. When the upward load is transferred to the slide deck, the slide deck is lifted upward relative to the floor surface of the vehicle and then dropped until contacting the support roller (i.e., the slide deck vertically rattles), and therefore, abnormal noise may be generated from a slide deck device.

However, the prior art slide deck device has not been designed to prevent the lifting up of the slide deck.

An object of the present invention is to provide a slide deck device for a vehicle which prevents a slide deck from rattling with respect to a floor surface of the vehicle even if an upward load is applied to the slide deck in a state where the slide deck is completely drawn into a vehicle.

Solution to Problem

A slide deck device, for a vehicle, according to the present invention includes a slide deck which is slidably supported in a longitudinal direction on a floor surface of a luggage compartment of a vehicle, which includes a back door, and can be drawn to the rear of the vehicle from a accommodated position where the slide deck is completely accommodated in the luggage compartment; a supporting member provided on the floor surface or provided on a fixing member on the floor surface, the supporting member supporting the undersurface of the slide deck; a floor contact-member provided on the floor surface or provided on the fixing member on the floor surface; and a slide deck contact-member, provided on the undersurface of the slide deck, which is in contact with the undersurface of the floor contact-member when the slide deck is located at the accommodated position, and which is not in contact with the undersurface of the floor contact-member when the slide deck is located more rearward than the accommodated position.

It is preferable for one of the floor contact-member and the slide deck contact-member to have a cushion member which can be elastically deformed in a vertical direction and to have a cover member which covers a facing surface of the cushion member facing the other member, and for the other of the floor contact-member and the slide deck contact-member to be in contact with the cover member, when the slide deck is located at the accommodated position, to compress the cushion member in a vertical direction.

It is preferable for a support bracket supporting the supporting member to be provided on the floor surface, and for the cushion member to be supported by the support bracket.

It is preferable for the slide deck device to further include a noncontact portion, an inclined pressing portion, and a contact portion. The slide deck is located more rearward than the accommodated position, whereby when the other of the floor contact-member and the slide deck contact-member faces the cover member in a vertical direction, the noncontact portion is withdrawn from the cover member in a vertical direction. The inclined pressing portion extends in a direction inclining relative to the horizontal direction from the end in a sliding direction of the noncontact portion. When the slide deck is located more rearward than the accommodated position, the inclined pressing portion faces the cover member in the longitudinal direction. The contact portion is connected to the end on the opposite side of the noncontact portion of the inclined pressing portion. When the slide deck is located at the accommodated position, the contact portion is in contact with the cover member to move the cover member in a direction that the cushion member is compressed in comparison with the case when the cover member faces the noncontact portion in the vertical direction.

Namely, in the case where the floor contact-member is provided with the cushion member and the cover member, the slide deck contact-member preferably includes a noncontact portion, an inclined pressing portion, and a contact portion. The slide deck is located more rearward than the accommodated position, whereby when the slide deck contact-member faces the cover member in a vertical direction, the noncontact portion spaces apart from the undersurface of the cover member in a vertical direction. The inclined pressing portion extends obliquely rearward and upward from the rear end of the noncontact portion and, when the slide deck is located more rearward than the accommodated position, faces the rear edge of the cover member in the longitudinal direction. The contact portion connects to the upper end of the inclined pressing portion. When the slide deck is located at the accommodated position, the contact portion is in contact with the undersurface of the cover member to move the cover member upward relative to the case when the cover member faces the noncontact portion in the vertical direction.

In the case where the slide deck contact-member is provided with the cushion member and the cover member, the floor contact-member preferably includes a noncontact portion, an inclined pressing portion, and a contact portion. The slide deck is located more rearward than the accommodated position, whereby when the floor contact-member faces the cover member in a vertical direction, the noncontact portion is withdrawn from the upper surface of the cover member in a vertical direction. The inclined pressing portion extends obliquely forward and downward from the front end of the noncontact portion. When the slide deck is located more rearward than the accommodated position, the inclined pressing portion faces the front edge of the cover member in the longitudinal direction. The contact portion connects to the lower end of the inclined pressing portion. When the slide deck is located at the accommodated position, the contact portion is in contact with the upper surface of the cover member to move the cover member downward relative to the case when the cover member faces the noncontact portion in the vertical direction.

The supporting member can serve as the floor contact-member, and the slide deck contact-member may be a plate spring. The intermediate portion or the rear portion of the plate spring is supported like a cantilever by a member fixed to the undersurface of the slide deck or the undersurface of the slide deck, and when the slide deck is located at the accommodated position, the plate spring is in contact with the floor contact-member.

In the above case, the plate spring may include an inclined portion and a holding portion. The inclined portion extends in a direction inclining relative to the horizontal direction. When the slide deck is located more rearward than the accommodated position, the inclined portion is located behind the supporting member at the same vertical direction position as the supporting member. The holding portion connects to the rear end of the inclined portion. When the slide deck is located at the accommodated position, the holding portion is in contact with the undersurface of the supporting member.

Furthermore, the supporting member may be a support roller which can rotate around a rotation shaft extending in a vehicle width direction and supports the undersurface of the slide deck.

Advantageous Effects of Invention

According to the invention of a first aspect, when the slide deck is located at the accommodated position, the slide deck contact-member provided on the undersurface of the slide deck is in contact with the undersurface of the floor contact-member provided on the floor surface. Thus, if an upward load is applied to the slide deck such as by vibration during driving, the slide deck does not lift up with respect to the floor surface of the vehicle.

Moreover, since the supporting member supports the undersurface of the slide deck, the slide deck does not rattle in the downward direction.

Thus, it is possible to prevent a vertical rattle of the slide deck occurring when the slide deck is located at the accommodated position.

According to the construction of a second aspect of the invention, one of the floor contact-member and the slide deck contact-member includes the cushion member which can be elastically deformed in a vertical direction. Therefore, even if the vertical-direction positions of the opposing surfaces (contact surfaces) of the floor contact-member and the slide deck contact-member are slightly deviated from each other, the opposing surfaces of the floor contact-member and the slide deck contact-member can be in contact with each other. Thus, when the slide deck reaches the accommodated position, the vertical rattle of the slide deck can be reliably prevented.

Furthermore, when a vertical load is applied to the slide deck, it is possible to prevent an unreasonable load from being applied between the floor contact-member and the slide deck contact-member.

According to the construction of a third aspect of the invention, since the support bracket supports the supporting member and the cushion member, the number of components can be reduced in comparison with the case where the cushion member is supported by a different member from the support bracket.

According to the construction of a fourth aspect of the invention, although a step is formed between the noncontact portion and the contact portion, the noncontact portion and the contact portion are connected by the inclined pressing portion inclining relative to the horizontal direction, and therefore, the slide deck can be smoothly slid from the rear of the accommodated position to the accommodated position.

According to the construction of a fifth aspect of the invention, since the supporting member serves the floor contact-member, the number of components can be reduced.

Furthermore, the slide deck contact-member is an elastically deformable cantilever spring, so that the requirements for the mounting position accuracy requirement of the slide deck contact-member to the slide deck and the mounting position accuracy of the supporting member to the floor surface can be alleviated. Thus, the mounting operation of the supporting member and the slide deck contact-member is simplified.

According to the construction of a sixth aspect of the invention, as in the case of the fourth aspect, the slide deck can be smoothly slid from the rear of the accommodated position to the accommodated position.

According to the construction of a seventh aspect of the invention, the slide deck can be more smoothly operated.

BRIEF DESCRIPTION OF DRAWINGS

FIG. 2 is an exploded perspective view of a slide deck device as viewed from the rear side thereof;

FIG. 7 is an exploded perspective view of a slide deck device of a second embodiment of the present invention;

FIG. 21 is an exploded perspective view, similar to FIG. 2, of a modification of the first embodiment.

REFERENCE SIGNS LIST

Figure 1:
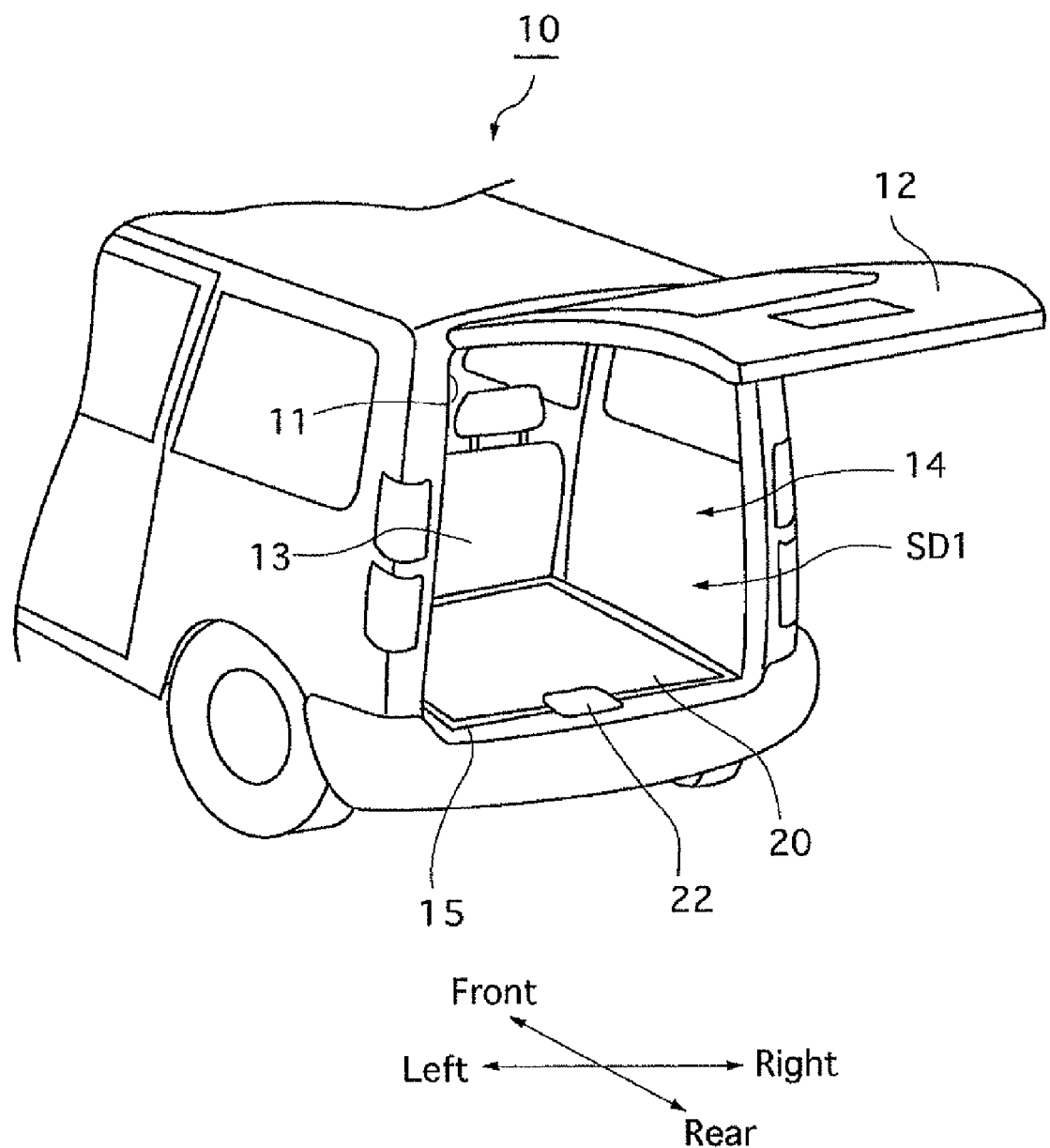
FIG. 1 is a rear perspective view of a vehicle to which a first embodiment of the present invention is applied.
Figure 3:
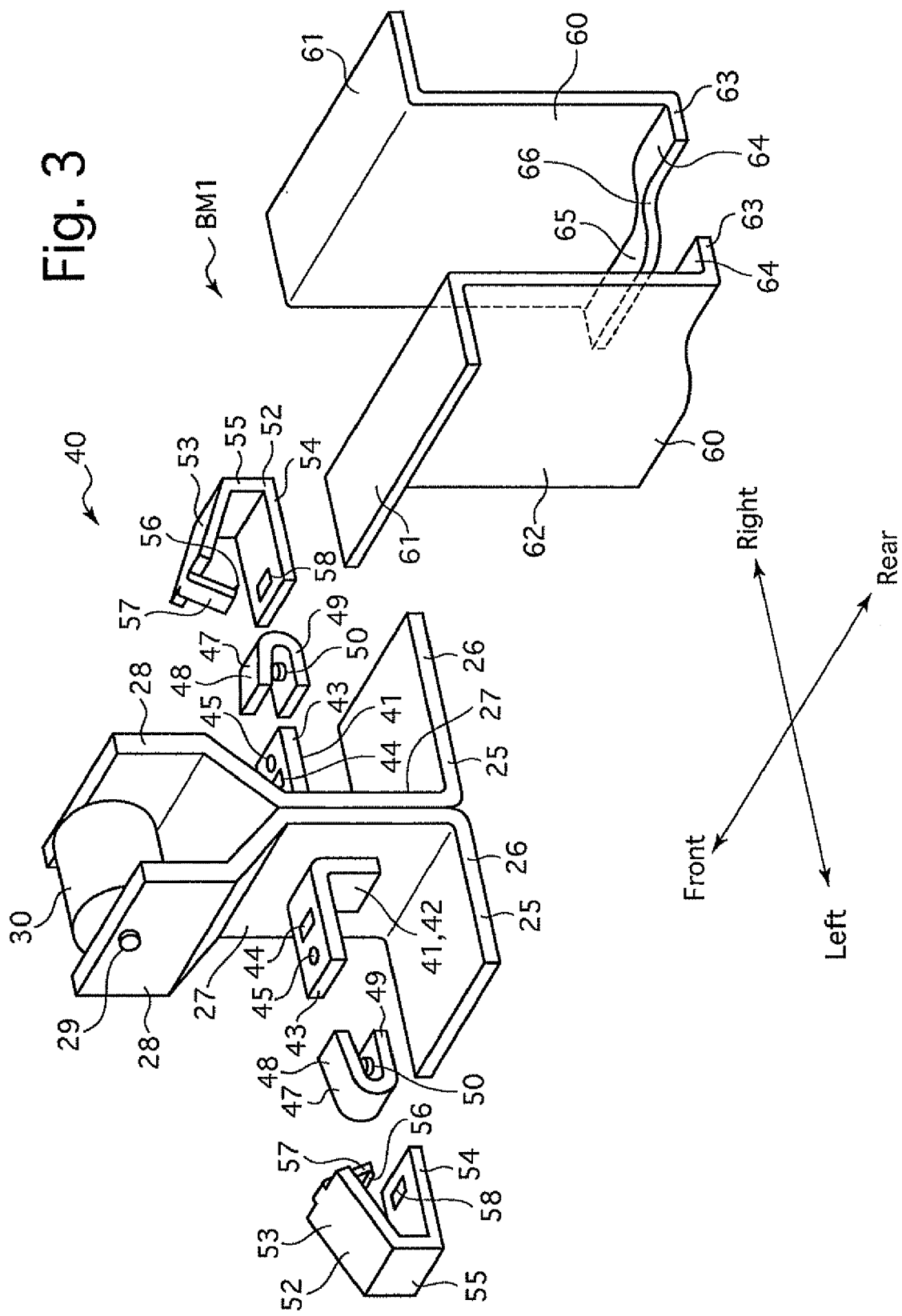
FIG. 3 is an exploded perspective view of a rattle prevention mechanism.

10 Automobile (vehicle)
11 Back opening
12 Back door
13 Second-row seat
14 Luggage compartment
15 Bottom plate (floor surface of luggage compartment)
17 Lower rail
20 Slide deck
21 Upper rail
22 Unlock handle
25 Support bracket
26 Lower end fixing portion
27 Vertical portion
28 Roller supporting portion
29 Rotation center shaft
30 Support roller (supporting member)
31 Rotation center hole
40 Uplift prevention mechanism
41 Supporting member
42 Vertical piece
43 Horizontal piece
44 Long through-hole
45 Circular through-hole
47 Cushion member (floor contact-member) (slide deck contact-member)
48 Upper piece
49 Lower piece
50 Engaging protruding portion
52 Cover member (floor contact-member) (slide deck contact-member)
53 Upper piece
54 Lower piece
55 Connecting piece
56 Engagement claw
57 Insertion piece
58 Long through-hole
60 Contact member (slide deck contact-member)
61 Fixing piece
62 Downward-extending piece
63 Lower portion piece
64 Contact portion
65 Noncontact portion
66 Inclined pressing portion
67 Bracket
70 Contact member (floor contact-member)
71 Bracket
73 Upper portion piece
74 Contact portion
75 Noncontact portion
76 Inclined pressing portion
85 Rail unit
86 Front bracket
86a Support piece
87 Rear bracket
87a Support piece
89 Rear-end stopper member
90 Lower rail
91 Bottom plate portion
92 Side plate portion
93 Retaining portion
94 Cover member
96, 97, 98 Locked member
99 Lock hole
100 Uplift prevention mechanism
101 Front connecting member
103 Rear connecting member (fixing member in the floor surface)
104 Load supporting portion
105 Through-hole
107 Support bracket
108 Rotation shaft
109 Support roller (supporting member) (floor contact-member)
110 Upper rail
111 Horizontal support piece
111a Notch
112, 113 Roller support piece
114 Rotation supporting shaft
115, 116 Roller
118 Lock claw supporting member
120 Through-hole
121 Engaging protruding portion
122 Lock claw
124 Pressed portion
125 Nut supporting plate
125a Positioning hole
125b Nut
125c Projection welding
127 Nut supporting plate
127a Positioning hole
127b, 127c Nut
127d Projection welding
130 Deck unit
131 Slide deck
132 Holding recess
133 Holding recess
135 Operation recess
136, 137 Attachment recess
139 Rotation supporting shaft
140 Operation member
142 Rotary pulley
143 Rotation supporting shaft
144 Lock switching member
145 Connecting piece
146 Pressing piece
148 Large-diameter circular hole
149 Narrow portion
150 Potbelly hole
151, 152, 153, 154 Through-hole
155 Cover plate
156 Support bracket (slide deck contact-member)
157 Plate spring
157a Fixed end portion
157b Elastic deformation portion
157c Holding portion
157d Inclined portion
B1, b2 Bolt
B3 Front-end stopper member
BM1, BM2 Rattle prevention mechanism
H1 Weight reducing hole
H2a, H2b Through-hole
H3a, H3b Through-hole
H4a, H4b, H4c, H4d Through-hole
P1 Pin member
P1a Holding member
P2 Positioning pin
S Tension spring SD1, SD2 Slide deck device
T Coating tube
W Operation wire

DESCRIPTION OF EMBODIMENTS

Hereinafter, a first embodiment of the present invention will be described with reference to FIGS. 1 to 6. The front/rear direction and the left/right direction in the description of the present embodiment are based on the direction of the arrows in the drawings.

The back surface of a vehicle 10 has a back opening 11. An upper edge portion of a back door 12 having the same frontal shape as the back opening 11 is rotatably pivotally attached to the upper edge portion of the back opening 11 via a rotation shaft (not shown) extending in the left/right direction. The vehicle 10 includes two rows of front and rear seats (a reference numeral 13 of FIG. 1 is a seat in the second row) and a luggage compartment 14 provided behind the second-row seat 13.

A pair of left and right lower rails 17 extending in the front/rear direction and having a channel shape are fixed to the upper surface of a metal bottom plate (the floor surface of the luggage compartment) 15 that constitutes the bottom surface of the luggage compartment 14.

A slide deck 20 having substantially the same shape as the planar shape of the luggage compartment 14 is disposed directly above the bottom plate 15 in a state of being spaced apart from the bottom plate 15. A pair of left and right upper rails 21 having a channel shape is fixed onto the undersurface of the slide deck 21, and the left and right upper rails 21 are slidably fitted in the left and right lower rails 17, respectively. Thus, the slide deck 20 can slide in the front/rear direction along the left and right lower rails 17. More specifically, the slide deck 20 can slide between a accommodated position (a position shown in FIG. 1) at which the entire slide deck 20 is completely accommodated in the luggage compartment 14 and a maximum drawn position at which the majority of the slide deck 20 protrudes from the back opening 11 to the rear side of the vehicle 10.

The slide deck 20 is further provided at its rear end portion with an unlock handle 22, rotatably provided via a rotation shaft (not shown) extending in the left/right direction. The unlock handle 22 is usually located at the locked position (the position of FIG. 1) by the biasing force of a spring (not shown), and it is manually operated to be rotated to the unlocked position. The unlock handle 22 interlocks with a lock device (not shown) of the left and right upper rails 21 through an operation wire (not shown). The lock device includes a lock claw (not shown) which is engageable with lock holes (not shown) formed in the side surfaces of left and right lower rails 17. If the unlock handle 22 is located at the locked position when the lock claw and the lock hole face each other, the lock claw of the lock device is fitted into the facing lock hole to enter into a locked state, and therefore, the upper rail 21 (the slide deck 20) cannot slide relative to the lower rail 17. Whereas, when the unlock handle 22 is manually rotated to the unlocked position, the unlock handle 22 enters an unlocked state in which the lock claw releases from the lock hole, and therefore, the upper rail 21 (the slide deck 20) can slide relative to the lower rail 17.

As illustrated in the drawings, the lower ends of a pair of left and right support brackets 25 are fixed near the rear end of the central portion, in the left/right direction, of the bottom plate 15. The support brackets 25 each have a lower end fixing portion 26 fixed to the bottom plate 15, a vertical portion 27 extending upwardly from the lower end fixing portion 26, and a roller supporting portion 28 extending upward while sloping from the vertical portion 27 and then extending straight upward. The vertical portions 27 of the left and right support brackets 25 are in contact with each other. A rotation center shaft 29 extending in the left/right direction is relatively non-rotatably bridged between the left and right roller supporting portions 28. The rotation center shaft 29 has a columnar shape with the exception of both the left and right ends, a rotation center hole 31 of a support roller 30 has a cylindrical shape and is rotatably fitted on the columnar portion of the rotation center shaft 29. As illustrated in the drawings, the upper end portion of the support roller 30 protrudes upward from the upper end surface of the support bracket 25 (the roller supporting portion 28).

Figure 4:
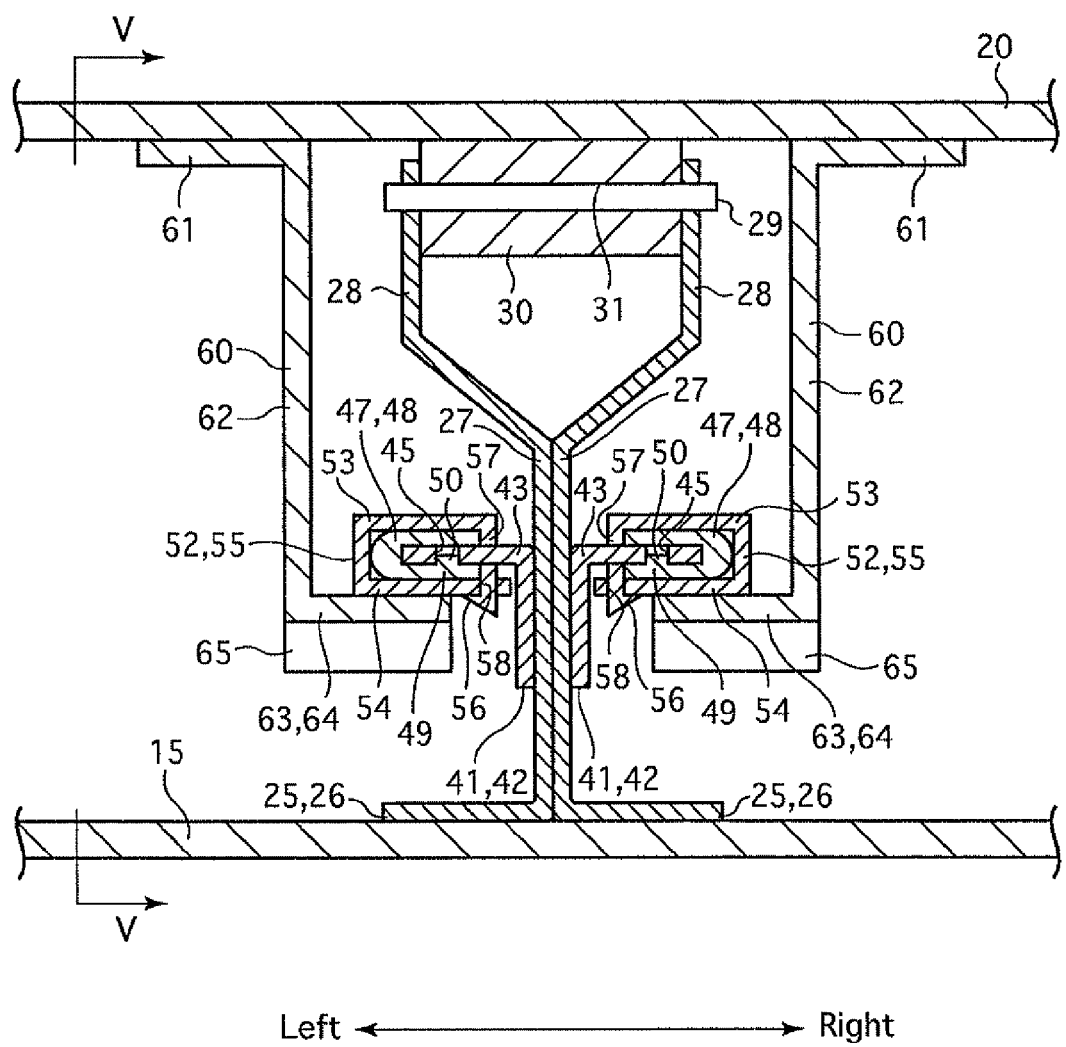
FIG. 4 is a cross-sectional rear view of a slide deck, a bottom plate of a luggage compartment, and the rattle prevention mechanism when the slide deck is located at the accommodated position.
Figure 5:
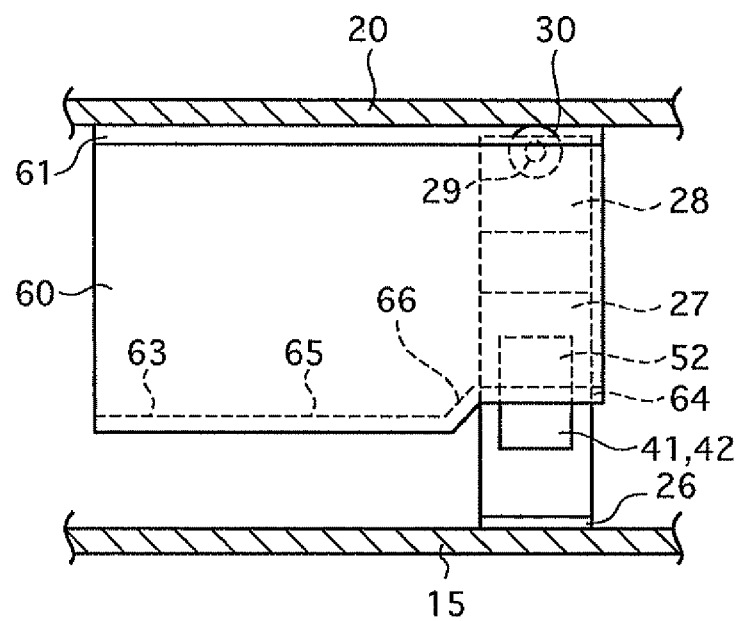
FIG. 5 is a cross-sectional view taken along a line V-V in FIG. 4.
Figure 6:
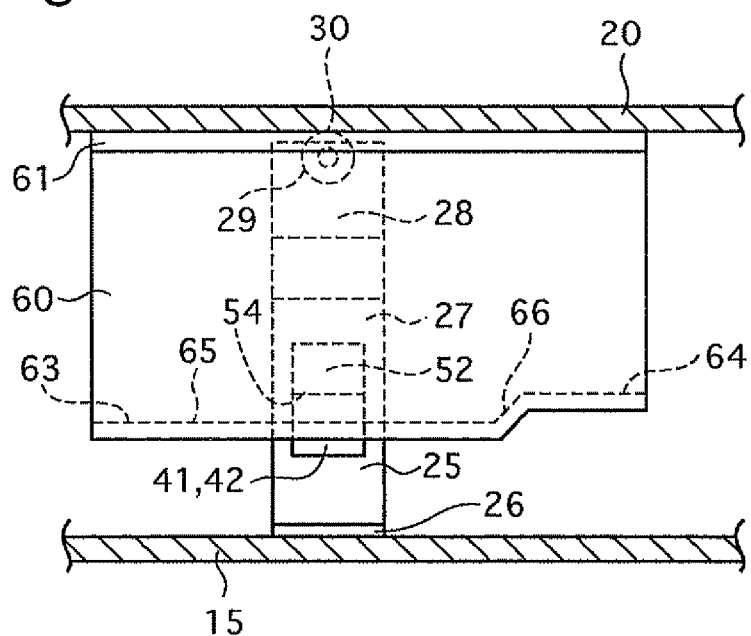
FIG. 6 is a cross-sectional view similar to FIG. 5 when the slide deck slides rearward from the accommodated position.
Figure 8:
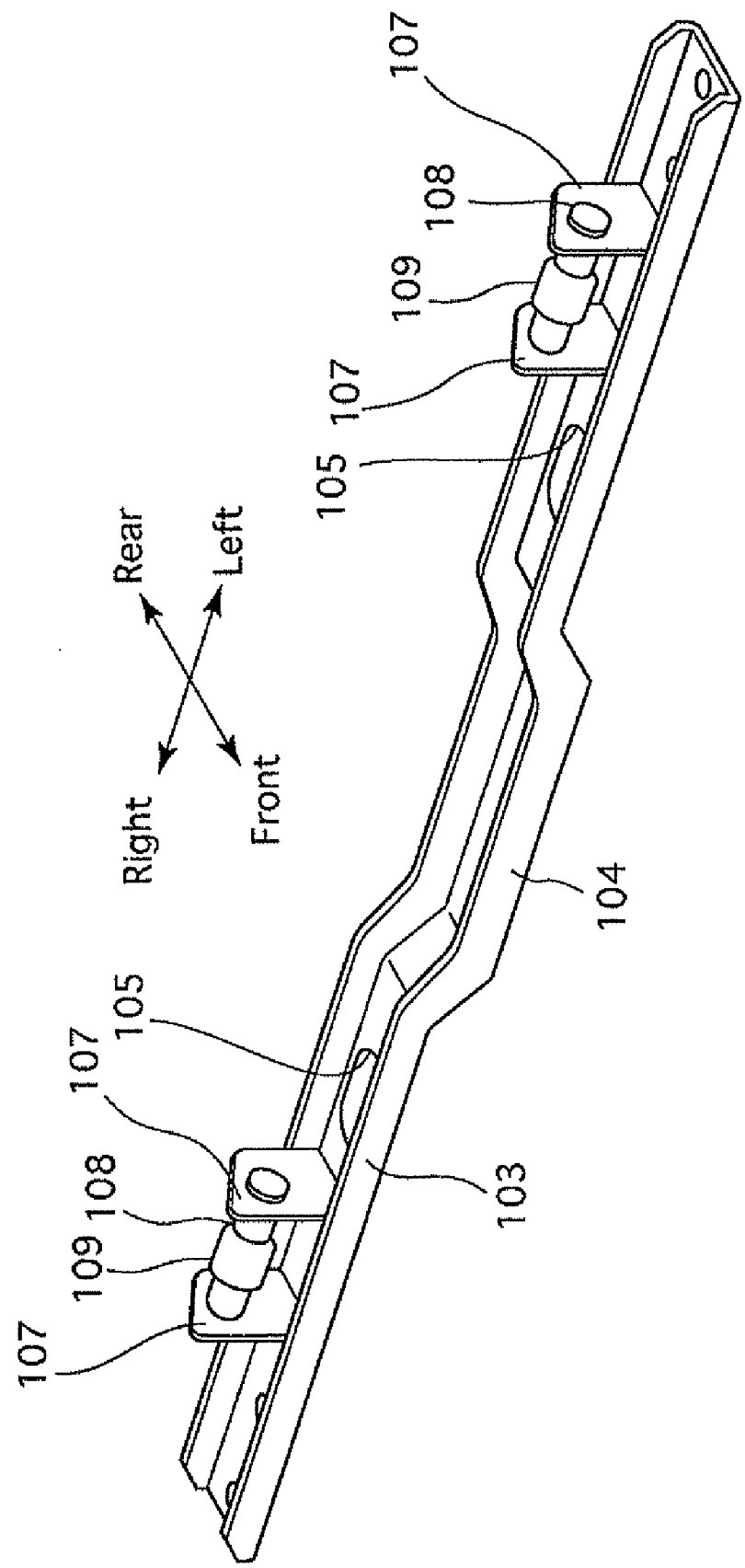
FIG. 8 is an enlarged perspective view of a rear connecting member and the fixing members thereof.

As shown in FIGS. 4 to 6, the upper end portion of the support roller 30 is rotatably in contact with the central portion, in the left/right direction, of the undersurface of the slide deck 20 to thereby support the corresponding portion of the undersurface of the slide deck 20. Thus, even if a heavy load is placed on the upper surface of the slide deck 20, the central portion, in the left/right direction, of the slide deck 20 does not significantly flex downward. Thus, even if a heavy load is placed, the slide deck 20 can be smoothly operated to slide.

Next, the structure of an uplift prevention mechanism 40 which is the feature of the present invention will be described. A vertical piece 42 of a supporting member 41, which is a part of the support bracket 25 (a component of the support bracket 25) and has an inverted L-shape in a frontward view, is secured to the lateral surfaces of each left and right support bracket 25. A long through-hole 44 extending in the front/rear direction and a circular through-hole 45 are drilled in a horizontal piece 43 of the supporting member 41. The circular through-hole 45 is located closer to the end of the horizontal piece 43 than the long through-hole 44.

A cushion member (floor contact-member) 47, having a substantially lateral U-shape in front view and formed of a flexible elastic material such as rubber (for example, EPDM), is fitted to the horizontal piece 43 of each of the left and right supporting members 41. The cushion member 47 includes an upper piece 48 that is in contact with the upper surface of the horizontal piece 43 and a lower piece 49 that is in contact with the undersurface of the horizontal piece 43, and a columnar engaging protruding portion 50 that is fittable into the circular through-hole 45 is provided so as to project from the upper surface of the lower piece 49.

A cover member (floor contact-member) 52 is a member covering the periphery of the cushion member 47 that fits onto the horizontal piece 43, and is formed of synthetic resin (for example, POM) that has high slidability. The cover member 52 has an upper piece 53; a lower piece 54, which is longer than the upper piece 53; a connecting piece 55 connecting the base ends of the upper piece 53 and the lower piece 54 and having the same width as the upper piece 53 and the lower piece 54; and an insertion piece 57 protruding downward from an end of the upper piece 53, having a width narrower than the width of the upper piece 53 and the lower piece 54, and including an engagement claw 56 at the front end. A long through-hole 58 through which the engagement claw 56 (the insertion piece 57) can pass is formed through the lower piece 54 near an end thereof. The upper piece 53 and the lower piece 54 of the cover member 52 respectively cover the upper piece 48 and the lower piece 49 in a state in which the cover member 52 is opened (in the state shown in FIG. 3 in which the engagement claw 56 is released from the long through-hole 58), and the engagement claw 56 passes through the long through-holes 44 and 58 and then engages with the undersurface of the lower piece 54, whereby the cushion member 47 and the horizontal piece 43 can be covered with the cover member 52 (see FIG. 4).

On the other hand, a pair of left and right metal contact members (slide deck contact-members) 60 is fixed near the rear end of the undersurface of the slide deck 20 (a portion facing the support bracket 25 when the slide deck 20 is located at the accommodated position of FIG. 1). Each contact member 60 is provided with a fixing piece 61 fixed to the undersurface of the slide deck 20, a downward-extending piece 62 extending downward from the fixing piece 61, and a lower portion piece 63 extending substantially horizontally inward from the lower end of the downward-extending piece 62. The lower portion piece 63 includes a substantially horizontal contact portion 64 which constitutes a rear portion of the lower portion piece 63, a substantially horizontal noncontact portion 65 located at a position one step lower than the contact portion 64, and an inclined pressing-portion 66 connecting the front end of the contact portion 64 and the rear end of the noncontact portion 65 and inclining relative to the horizontal direction. As shown in FIG. 6, when the slide deck 20 is located more rearward than the accommodated position, the inclined pressing portion 66 faces the rear edge portion of the lower piece 54 of the cover member 52 in the front/rear direction.

As shown in FIG. 4, a portion of the left and right lower pieces 63 that is located inwardly relative to the center, in the left/right direction, thereof (the right side portion of the left lower portion piece 63 and the left side portion of the right lower portion piece 63) and a portion of the left and right cover members 52 that is located outwardly relative to a substantial center in the left/right direction thereof (the left side portion of the left cover member 52 and the right side portion of the right cover member 52) vertically face each other (they coincide at the left/right directional position). Furthermore, as shown in FIGS. 5 and 6, the upper surfaces of the contact portions 64 of the left and right contact members 60 and the undersurfaces of the left and right cover members 52 are located at the substantially same height (strictly speaking, when the slide deck 20 moves rearward from the accommodated position, the upper surface of the contact portion 64 is located slightly above the undersurface of the cover member 52). Whereas, the noncontact portions 65 of the left and right contact members 60 are located at a position lower than the undersurfaces of the left and right cover members 52.

Among the above-described components, the support bracket 25, the supporting member 41, the cushion member 47, the cover member 52, and the contact member 60 are constituent elements of the uplift prevention mechanism 40. The rotation center shaft 29, the support roller 30, and the uplift prevention mechanism 40 are constituent elements of a rattle prevention mechanism BM1. The lower rail 17, the slide deck 20, the upper rail 21, the unlock handle 22, the uplift prevention mechanism 40, and the rattle prevention mechanism BM1 are constituent elements of a slide deck device SD1.

Next, the operation of the slide deck device SD1 having the above constitution will be described.

When the back door 12 is located at a fully closed position so as to close the back opening 11, the slide deck 20 is located at the accommodated position at which the slide deck 20 is completely accommodated in the luggage compartment 14 (the position shown in FIG. 1), and the lock device holds the slide deck 20 at the accommodated position.

At this stage, as shown in FIGS. 4 and 5, the support roller 30 supports the central portion, in the left/right direction, of the undersurface of the slide deck 20, and the upper surface of the contact portion 64 of the contact member 60 is in contact with the undersurface of the lower piece 54 of the cover member 52 to slightly push the lower piece 54 upward relative to the state of FIG. 6 (a state in which the contact portion 64 is not in contact with the lower piece 54). Accordingly, the cushion member 47 is in a state of being vertically compressed (elastically deformed) (at this time, it is ideal that the cushion member 47 is compressed to the limit (so that the elasticity of the cushion member 47 is lost)). Thus, if the vehicle 10 is driven in this state, a load in the vertical direction may be applied to the slide deck 20 by vibration during driving; however, since the slide deck 20 does not rattle vertically with respect to the bottom plate 15, abnormal noise does not occur from the slide deck device SD1.

Whereas, if the back opening 11 is opened in a state where the vehicle 10 is stopped and the unlock handle 22 is then operated to rotate to the unlocked position in order to release the locked state by the lock device, the slide deck 20 can be drawn rearward from the luggage compartment 14.

When the slide deck 20 is drawn rearward, the support roller 30 continues to support the undersurface of the slide deck 20, as shown in FIG. 6. However, since the cover member 52 vertically faces the noncontact portion 65 located at a position one step lower than the contact portion 64, the undersurface of the cover member 52 and the upper surface of the noncontact portion 65 are not in contact with each other (therefore, the lower piece 54 of the cover member 52 moves downward slightly, and, in addition, the cushion member 47 returns to its free state). When the cover member 52 and the lower portion piece 63 (the noncontact portion 65) are not in contact with each other, the lifting up of the slide deck 20 with respect to the bottom plate 15 cannot be prevented. However, the vehicle 10 does not drive in such a state in which the back opening 11 is opened and the slide deck 20 is drawn to the rear of the vehicle 10. Therefore, in the state where the slide deck 20 is drawn to the rear of the vehicle 10, there is no problem even if the lifting up of the slide deck 20 is not prevented.

Furthermore, when the slide deck 20, which has been drawn to the rear of the vehicle 10, is slid forward, the inclined pressing portion 66 is in contact with the rear edge portion of the lower piece 54 immediately before reaching the accommodated position. When the slide deck 20 is further slid forward, the lower piece 54 is pressed upward by the slope of the inclined pressing portion 66, and therefore, the cushion member 47 is gradually compressed. When the slide deck 20 reaches the accommodated position, the lower piece 54 rides over the inclined pressing portion 66, and the undersurface of the lower piece 54 is in contact with the contact portion 64.

According to the present embodiment, the vertical rattle of the slide deck 20 during the driving of the vehicle 10 can be reliably prevented.

Furthermore, the cover member 52, which is a member in contact with the contact portion 64 of the contact member 60, and the cushion member 47, which is a member located inside the cover member 52, are deformable; therefore, even if the position of the upper surface of the contact portion 64 and an the position of the undersurface of the 52 are slightly deviated, the upper surface of the contact portion 64 and the undersurface of the cover member 52 can be brought into contact with each other when the slide deck 20 is located at the accommodated position. Thus, when the slide deck 20 reaches the accommodated position, the vertical rattle of the slide deck 20 can be reliably prevented.

Furthermore, even if a load in the vertical direction is applied to the slide deck 20 when the slide deck 20 is located at the accommodated position, the cushion member 47 and the cover member 52 absorb this load, and therefore, an unreasonable load is not applied to between the cover member 52 and the contact member 60.

Furthermore, since the contact member 60 is provided with the inclined pressing portion 66, the slide deck 20 that has been drawn to the rear of the vehicle 10 can be smoothly slid to the accommodated position.

Next, a second embodiment of the present invention will be described with reference to FIGS. 7 to 20. The same components as those in the first embodiment are assigned with the same reference numerals, and detailed explanations thereof are omitted.

A slide deck device SD2 is configured of a rail unit 85 and a deck unit 130 which are separable from each other.

First, the structure of the rail unit 85 will be described.

Figure 13:
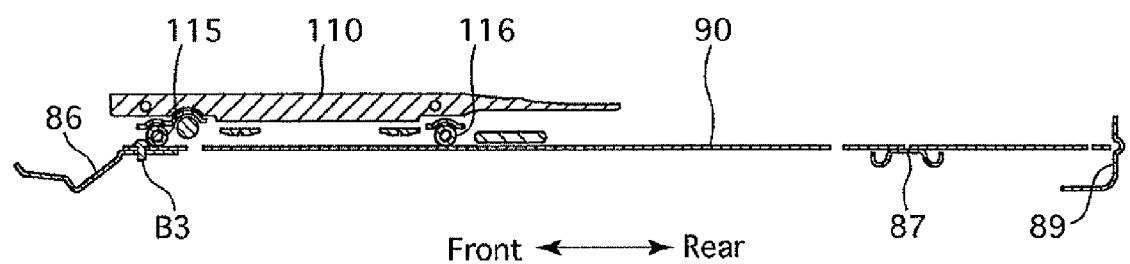
FIG. 13 is a cross-sectional view taken along an arrow line XIII-XIII in FIG. 10.
Figure 14:
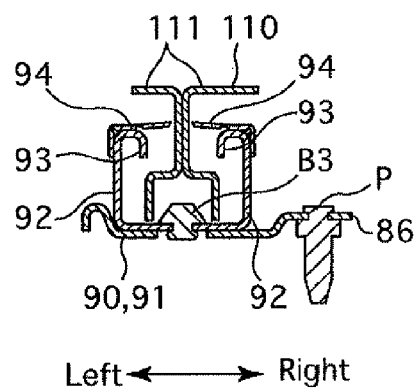
FIG. 14 is a cross-sectional view taken along an arrow line XIV-XIV in FIG. 10.
Figure 15:
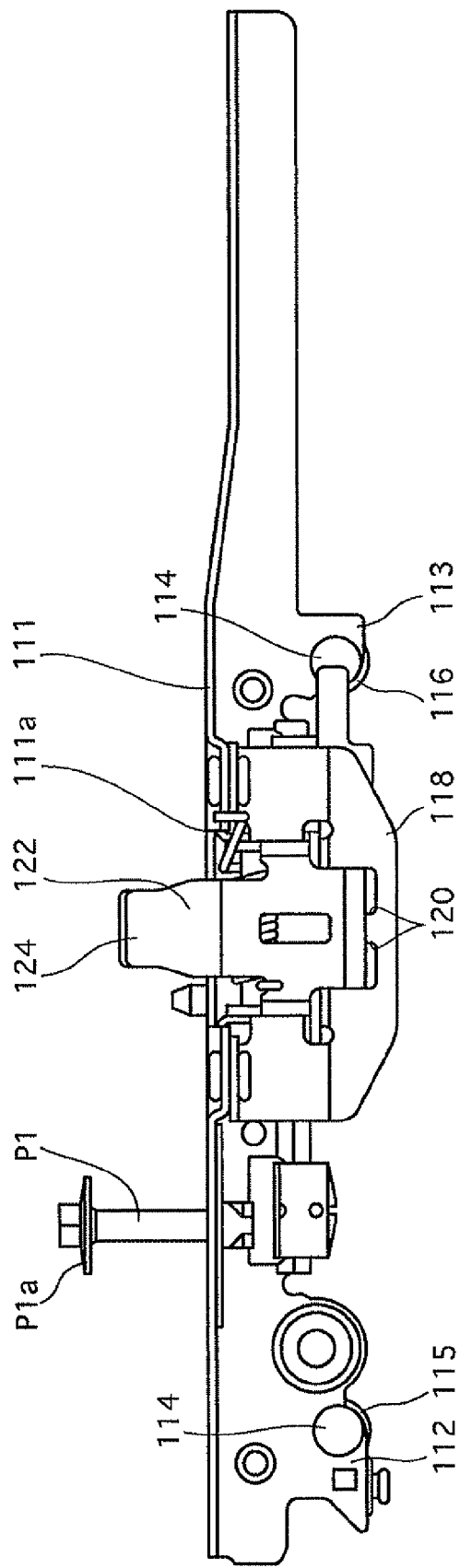
FIG. 15 is a side view of an upper rail and a lock mechanism.

The rail unit 85 has left and right lower rails 90, and the left and right lower rails 90 each have a front bracket 86 fixed to the front end portion of the undersurface of the lower rail 90. A rear bracket 87 is fixed near the rear end portion of the undersurface of the lower rail 90. The front and rear brackets 86 and 87 each have a through-hole, and are fixed to the bottom plate 15 using bolts B1 and B2 passing through their respective through-holes. Furthermore, locking pins P (see FIGS. 7 and 12), extending through the left and right front brackets 86 from top to bottom, are fitted into locking holes (not shown) formed through the bottom plate 15. The left and right lower rails 90 are metal channel materials that extend in the front/rear direction, have opened upper surfaces, and are parallel to each other. Rear-end stopper members 89 are secured to the rear ends of the left and right lower rails 90, and each closes the rear end opening of each corresponding lower rail 90 and has an undersurface that is in contact with the bottom plate 15. Whereas, the front end openings of the left and right lower rails 90 are open. As shown in FIGS. 13 and 14, a front-end stopper member B3 is fixed to the front end portion of the bottom portion of the lower rail 90, and the peripheral edge of the head of the front-end stopper member B3 is a tapered surface whose diameter increases from top to bottom.

Figure 16:
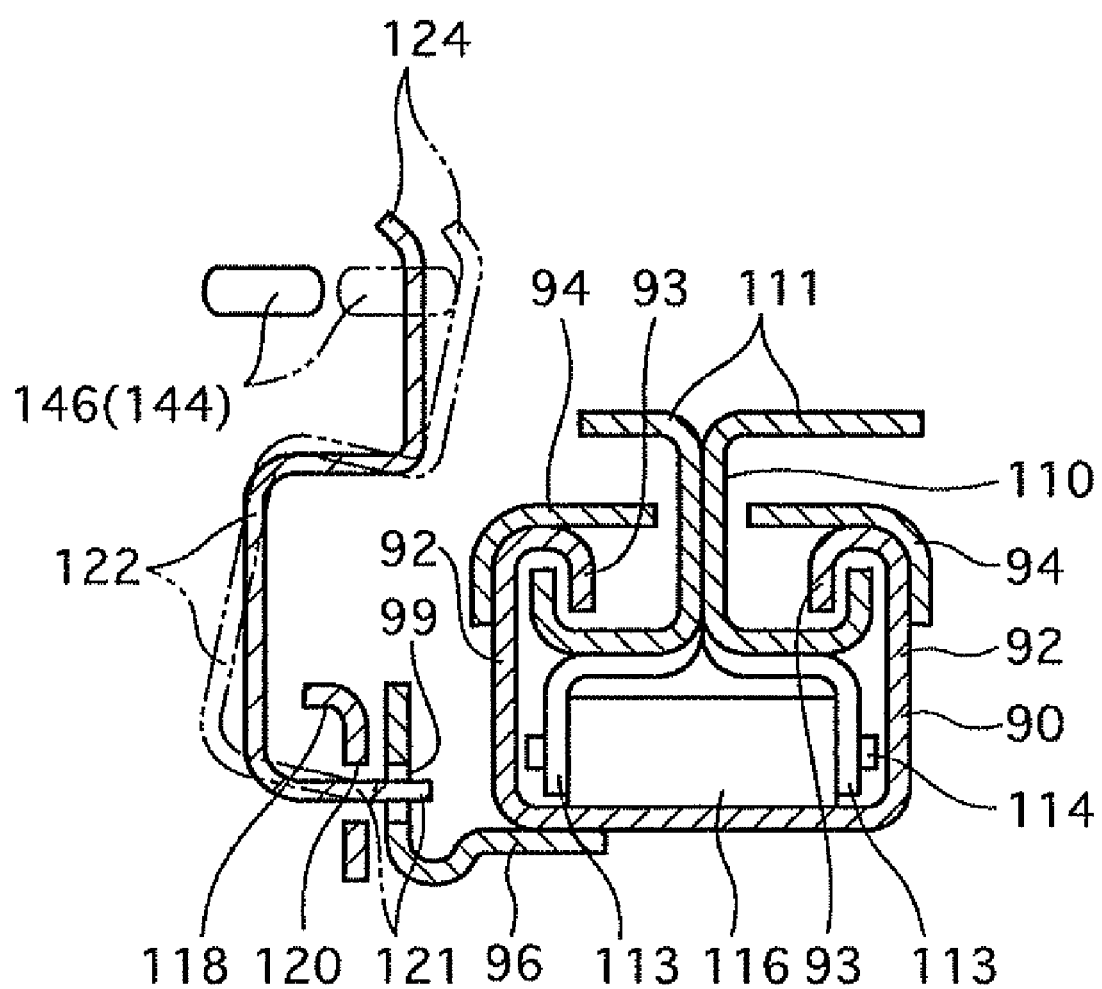
FIG. 16 is a cross-sectional view of a lower rail, the upper rail, and the lock mechanism.
Figure 17:
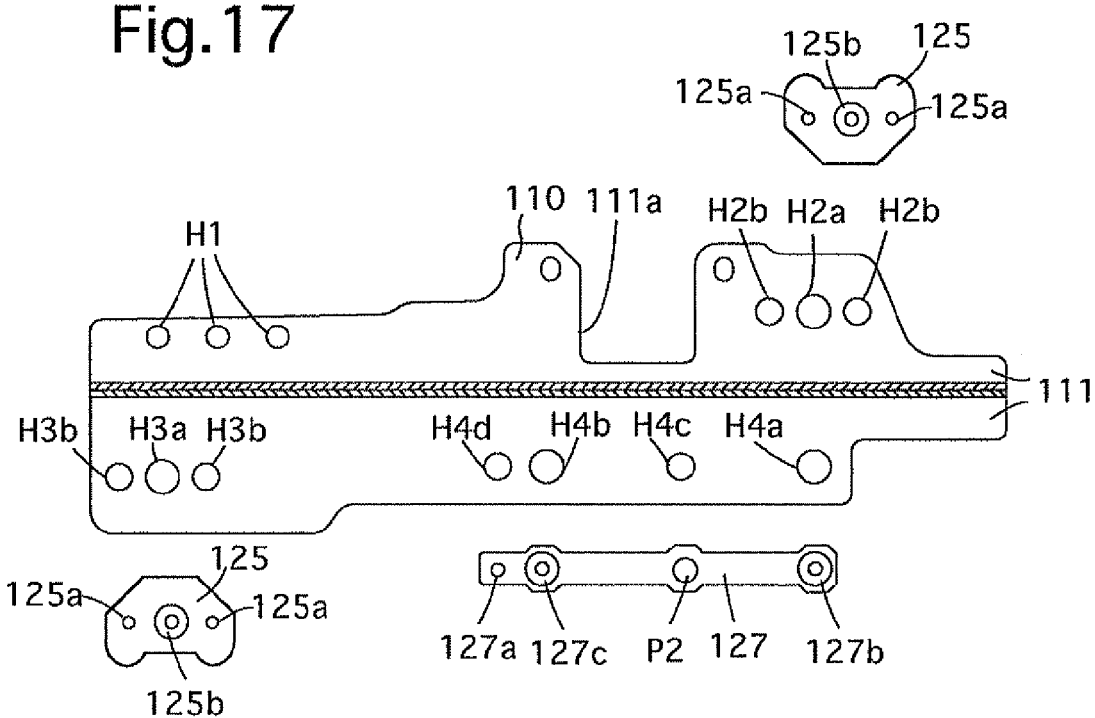
FIG. 17 is a bottom view when the upper rail and three nut supporting plates are separated from each other.
Figure 18:
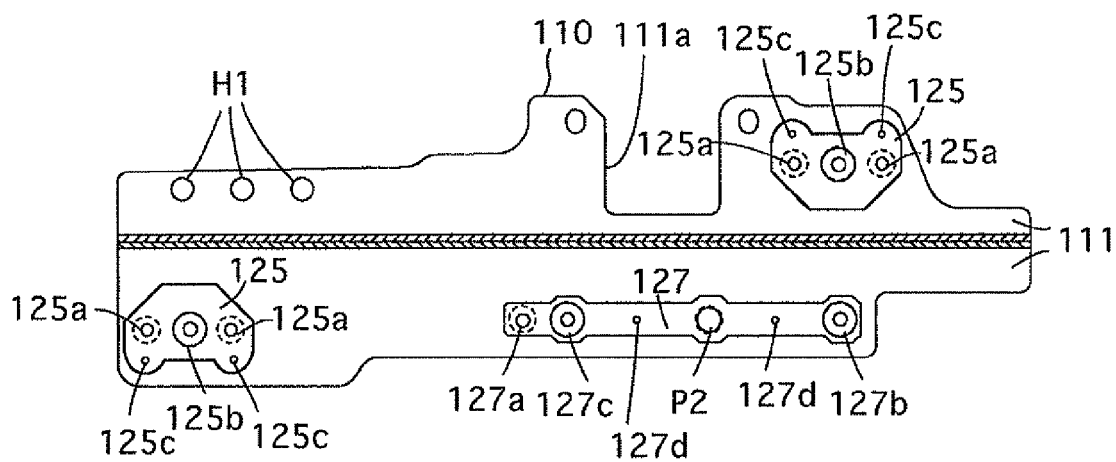
FIG. 18 is a bottom view when the three nut supporting plates are welded to the upper rail.

As shown in FIGS. 14 and 16, the lower rail 90 includes a bottom plate portion 91, a pair of left and right side plate portions 92 extending upward from both the left and right sides of the bottom plate portion 91, and retaining portions 93 extending substantially horizontally inward from the upper ends of the left and right side plate portions 92 and then extending downward. Furthermore, a rubber cover member 94 is secured onto the upper surface of each of the left and right retaining portions 93 over the entire length thereof. Furthermore, three metal locked members 96, 97, and 98, arranged in the front/rear direction, are welded to the vehicle lateral surfaces of the left and right lower rails 90, and a pair of front and rear lock holes 99 is drilled in each of the locked members 96, 97, and 98.

Figure 19:
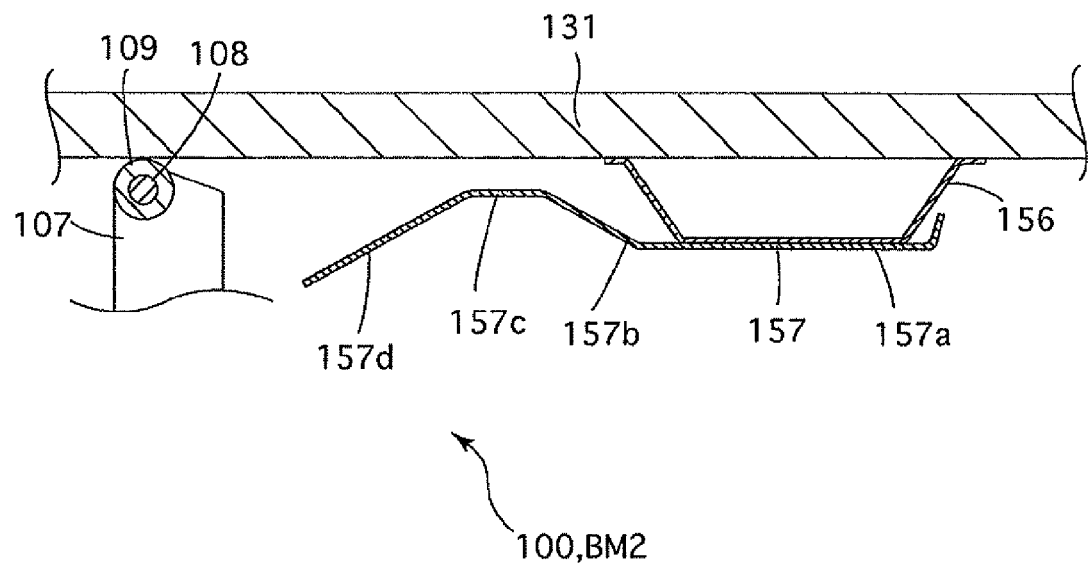
FIG. 19 is a vertical cross-sectional side view of a slide board, a support bracket, and a support roller when the slide board unit is located more rearward than the accommodated position.
Figure 20:
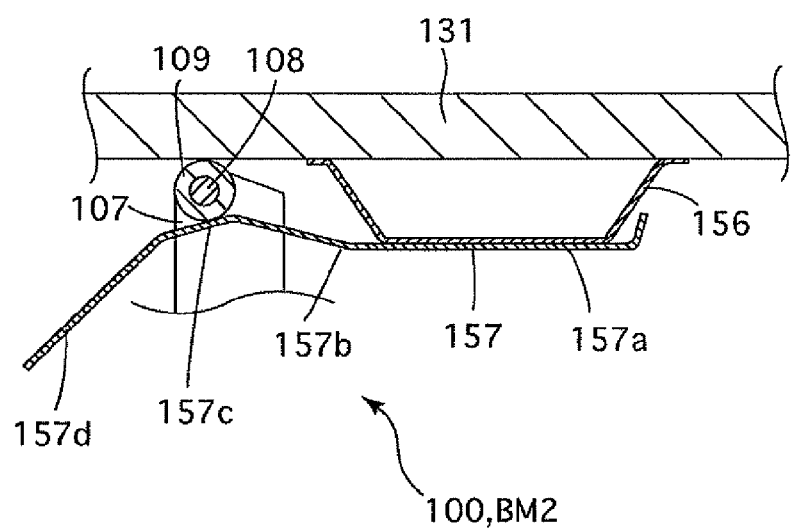
FIG. 20 is a cross-sectional side view, similar to FIG. 19, when the slide board unit is located at the accommodated position.

Both the left and right ends of a metal front connecting member 101 extending horizontally are screw-fastened to support pieces 86a provided at the front end portions of the left and right front brackets 86. The front connecting member 101 has a columnar shape with the exception of both the left and right ends thereof. Both the left and right ends of a metal rear connecting member (a fixing member on the floor surface) 103 extending in the left/right direction are fixed to support pieces 87a that constitute the inside end portions of the left and right rear brackets 87 by using a rivet and by projection welding. The rear connecting member 103 is a channel material having an open upper surface. The central portion, in the left/right direction, of the undersurface of the rear connecting member 103 is stepped downward compared to the peripheral portions and constitutes a load supporting portion 104 whose undersurface is abutted against the bottom plate 15. Two through-holes 105 are formed at two locations through the bottom surface of the rear connecting member 103. A pair of left and right metal support brackets 107 is fixed to left and right positions on the upper surface of the rear connecting member 103. A rotation shaft 108 extending in the left/right direction is bridged between the upper ends of the pair of support brackets 107. A columnar support roller (a supporting member) (a floor contact-member) 109 located between the left and right support brackets 107 and having an upper end that is located above the upper ends of the support brackets 107 is rotatably supported about the rotation shaft 108. As shown in FIGS. 19 and 20, the upper end of the support roller 109 is located above the upper end surface of the support bracket 107.

The left and right lower rails 90 slidably support upper rails 110 which are members formed by joining two symmetrical metal members. The upper end portion of the upper rail 110 is provided with a substantially horizontal support piece 111, and a roller support piece 112 and a roller support pieces 113, which are provided as a left and right pair, are provided so as to project downward from the front and rear end portions of the upper rail 110. A roller 115 is rotatably supported between the left and right support pieces 112 by a rotation supporting shaft 114 extending in the left/right direction, and a roller 116 is rotatably supported between the left and right roller support pieces 113 by the rotation supporting shaft 114. Since the rollers 115 and 116 are placed on the upper surface of the bottom plate portion 91 of the lower rail 90, the rollers 115 and 116 roll along the upper surface of the bottom plate portion 91, whereby the left and right upper rails 110 slide in the front/rear direction relative to the left and right lower rails 90. The forward sliding movement of the upper rail 110 is limited the roller 115 coming in contact with the head portion of the front-end stopper member B3. Whereas, the rearward sliding of the upper rail 110 is limited by the roller 116 coming in contact with the rear-end stopper member 89.

A lock claw supporting member 118 is fixed to the undersurface of the horizontal support piece 111 outside the upper rail 110, and a pair of front and rear through-holes 120 is formed through lock claw supporting member 118 near the lower end thereof. In the lock claw supporting member 118, a metal lock claw 122 is rotatably supported around the rotation shaft in the front/rear direction. The lock claw 122 is located outside the lock claw supporting member 118 and includes a pair of front and rear engaging protruding portions 121 detachably engaged with the through-holes 120 and the lock holes 99. The lock claw 122 can rotate between a locked position (the solid line position of FIG. 16), at which the engaging protruding portion 121 is engaged with the through-holes 120 and the lock holes 99, and an unlocked position (the virtual line position of FIG. 16), at which the engaging protruding portion 121 is detached from the through-holes 120 and the lock holes 99 toward the outer-vehicle side; the lock claw 122 is rotationally biased toward the locked position by a biasing force of a torsion coil spring (not shown). The upper end of the lock claw 122 is a pressed portion 124 which passes through a notch 111a formed in the horizontal support piece 111 on the outer-vehicle side and protrudes above the horizontal support piece 111.

As shown in FIGS. 7, 10, 17, 18, etc., the horizontal support pieces 111 of the left and right upper rails 110 have a plurality of circular through-holes. Each exterior horizontal support piece 111 (the left horizontal support piece 111 in the left upper rail 110 and the right horizontal support piece 111 in the right upper rail 110) is provided near the rear end thereof with three weight reducing holes H1 for reducing the weight of the upper rail 110. Furthermore, each exterior horizontal support piece 111 is provided near the front end thereof with a through-hole H2a and a pair of through-holes H2b having a smaller diameter than the through-hole H2a that are located in front of and behind the through-hole H2a. Whereas, the interior horizontal support piece 111 is provided near the rear end there of with a through-hole H3a having the same shape as that of the through-hole H2a and a pair of through-holes H3b having the same shape as the through-holes H2b. Furthermore, the interior horizontal support piece 111 is provided in the front portion thereof with through-holes H4a and H4b having the same shape as the through-hole H2a, a through-hole H4c located between the through-holes H4a and H4b, and a through-hole H4d located behind the through-hole H4b.

The exterior horizontal support piece 111 is provided on the undersurface thereof with a nut supporting plate 125 made from a metal plate and fixed thereto by projection welding. The nut supporting plate 125 has a pair of front and rear positioning holes 125a and a central through-hole (not shown) located between the front and rear positioning holes 125a, and a nut 125b is welded to a position corresponding to the central through-hole in the undersurface of the nut supporting plate 125. A central hole of the nut 125b and the central through-hole have the same diameter and are concentric with each other. Since the entire outer peripheral edge of the nut 125b and the undersurface of the nut supporting plate 125 are welded to each other, the nut 125b is firmly fixed to the nut supporting plate 125. When the nut supporting plate 125 is welded to the undersurface of the horizontal support piece 111, two pins fixed to a jig (not shown) located above the upper rail 110, while being precisely positioned with respect to the lower rail 90, are passed through the two though-holes H2b and the two positioning holes 125a of the nut supporting plate 125 that is in contact with the undersurface of the horizontal support piece 111. The diameter of the pins is the same as the diameter of the positioning holes 125a, and therefore, when the pins are passed through the positioning holes 125a, the nut supporting plate 125 is precisely positioned with respect to the horizontal support piece 111, the central hole of the nut 125b and the through-hole H2a overlap each other, and the front and rear through-holes H2b and the front and rear positioning hole 125a overlap each other. The front and rear points of the nut supporting plate 125 are projection-welded (125c) to the undersurface of the horizontal support piece 111 in the state in which the nut supporting plate 125 is positioned as described above.

The nut supporting plate 125 is further projection-welded 125c in a similar manner to the positions corresponding to the through-holes H3a and H3b of the undersurface of the interior horizontal support piece 111, the central hole of the nut 125b and the through-hole H3a overlap each other, and the front and rear through-holes H3b and the front and rear positioning hole 125a overlap each other.

A nut supporting plate 127 made from a metal plate is fixed to the front portion of the undersurface of the interior horizontal support piece 111 by projection welding. The nut supporting plate 127 has a pair of front and rear through-holes (not shown), a central through-hole located between the front and rear through-holes, and a positioning hole 127a located at the rear end. The lower end of a positioning pin P2 is fitted into the central through-hole, and the lower end and the peripheral edge of the central through-hole are welded. Nuts 127b and 127c are welded to the positions corresponding to the through-holes in the undersurface of the nut supporting plate 127. The central holes of the nuts 127b and 127c and the through-holes have the same diameter and are concentric with each other. Since the entire outer peripheral edges of the nuts 127b and 127c and the undersurface of the nut supporting plate 127 are welded, the nuts 127b and 127c are firmly fixed to the nut supporting plate 127. When the nut supporting plate 127 is welded to the undersurface of the horizontal support piece 111, the upper portion of the positioning pin P2 is first passed through the through-hole H4c so that the upper portion protrudes above the horizontal support piece 111, whereby the nut supporting plate 127 is in contact with the undersurface of the horizontal support piece 111. The nut 127b overlaps with the through-hole H4a, and the positioning hole 127a overlaps with the through-hole H4d. Thereafter, a pair of pins fixed to the jig, and having the same diameter as those of the positioning hole 127a and the central hole of the nut 127b, is respectively passed through the through-hole H4d and the positioning hole 127a, and the through-hole H4a and the central hole of the nut 127b. Accordingly, the nut supporting plate 127 is precisely positioned with respect to the horizontal support piece 111, and the central hole of the nut 127c overlaps with the through-hole H4b. The front and rear two locations of the nut supporting plate 127 are projection-welded 127d to the undersurface of the horizontal support piece 111 in the state where the nut supporting plate 127 is positioned in this manner.

Furthermore, the lower end of the pin member P1 including a circular holding member P1a provided near the upper end is inserted into the through-hole H4a, and a screw portion provided at the lower end of the pin member P1 is screwed into (fixed to) the nut 127b.

The above-described components are constituent elements of the rail unit 85, and the rail unit 85 is previously unitized outside the vehicle 10. The front and rear brackets 86 and 87 are fixed to the bottom plate 15 in the state that the rail unit 85 is unitized. Thus, when the rail unit 85 is attached to the bottom plate 15, the left and right lower rails 90 are parallel. In addition, the left and right lower rails 90, the front connecting member 101, and the rear connecting member 103 have a lattice structure, and therefore, even if the rail unit 85 is subjected to external force, the left and right lower rails 90 maintain their parallel state. Thus, the left and right upper rails 110 can always smoothly slide relative to the left and right lower rails 90.

Next, the structure of the deck unit 130 will be described.

A slide deck 131 which constitutes the main part of the deck unit 130 is a plate material having a rectangular shape in plan view. The left and right widths of the slide deck 131 are slightly larger than the space between the left and right lower rails 90, and the longitudinal length is substantially the same as the length of the lower rail 90.

The slide deck 131 has a pair of left and right holding recesses 132 and 133 provided near the rear end of the upper surface of the slide deck 131. The left and right holding recesses 132 and 133 have the same rectangular shape, and they are symmetric with respect to a center line extending in the longitudinal direction of the slide deck 131 (a straight line passing through the center of the slide deck 131 and extending in the longitudinal direction). Furthermore, the slide deck 131 is provided at the rear end of the upper surface thereof with an operation recess 135 located between the holding recesses 132 and 133. As illustrated in the drawings, the distance from the operation recess 135 to the holding recess 132 is smaller than the distance from the operation recess 135 to the holding recess 133. The operation recess 135 is provided on the front surface thereof with a through-hole (not shown) that communicably connects the operation recess 135 with a lower space of the slide deck 131. Furthermore, a pair of left and right attachment recesses 136 and 137 is provided near the front end of the upper surface of the slide deck 131. The left and right attachment recesses 136 and 137 have the same rectangular shape, and they are symmetric with respect to the above-mentioned center line.

The upper end of a rotation supporting shaft 139 extending vertically is rotatably provided at the position located immediately before the operation recess 135 on the undersurface of the slide deck 131. An operation member 140 is fixed near the upper end of the rotation supporting shaft 139 and passes through the through-hole to be located in the operation recess 135. The operation member 140 can rotate between an initial position shown by the solid line in FIG. 9 and an unlocking-operation position shown by a virtual line, and the operation member 140 is rotationally biased toward the initial position by a rotational biasing force of a coil spring (not shown) provided around the rotation supporting shaft 139. A rotary pulley 142, configured of a double pulley, is fixed to a portion located lower than the operation member 140 on the rotation supporting shaft 139. one end of each of two operation wires W is secured to the peripheral surface of the rotary pulley 142. The two operation wires W, other than each end thereof, are covered with a cover tube T formed of a flexible material. The other end of each of the operation wires W are located directly below the attachment recesses 136 and 137, respectively. The upper end of a rotation supporting shaft 143 extending downward is fixed to a portion located directly below each of the attachment recesses 136 and 137 in the undersurface of the slide deck 131, and the left and right rotation supporting shafts 143 each rotatably support a lock switching member 144 that has a substantially J-like shape in plan view. One end of the lock switching member 144 is a connecting piece 145 connected to the end of the operation wire W, and the other end is a pressing piece 146 parallel to the connecting piece 145. Since the ends of a tension spring S are respectively engaged with the lock switching member 144 and the undersurface of the slide deck 131, the left lock switching member 144 is rotationally biased in the clockwise direction with respect to FIG. 9, and the right lock switching member 144 is rotationally biased in the counterclockwise direction with respect to FIG. 9. The rotating operation of the operation member 140 and the rotating operation of the lock switching member 144 are interlinked due to the left and right lock switching members 144 being linked with the operation member 140 via the operation wires W, the rotary pulley 142, and the rotation supporting shaft 139. Thus, when the operation member 140 is located at the initial position, the lock switching member 144 is located at a lock allowing position (a position where the connecting piece 145 and the pressing piece 146 are substantially oriented in the front/rear direction) shown by the dashed line in FIG. 9; and when the operation member 140 is located at the unlocking-operation position, the lock switching member 144 is located at an unlocked position shown by the two-dot chain line in FIG. 9.

The attachment recesses 136 and 137 are provided in the bottom surfaces thereof with five through-holes that communicably connect the attachment recesses 136 and 137 with the lower space of the slide deck 131. The through-holes include a potbelly hole 150 having a large-diameter circular hole 148 and a narrow portion 149, which extends rearward from the rear end of the large-diameter circular hole 148 and is narrower than the width of the large-diameter circular hole 148. All the other through-holes have a circular shape: a through-hole 151 facing the through-hole H2a when the deck unit 130 is mounted to the left and right upper rails 110, a through-hole 152 facing the through-hole H3a, a through-hole 153 facing the nut 127c, and a through-hole 154 through which the positioning pin P2 passes are drilled.

The attachment recesses 136 and 137 can be removably closed by a cover plate 155 having the same planar shape as the attachment recesses 136 and 137 and formed of the same material as the slide deck 131.

Figure 9:
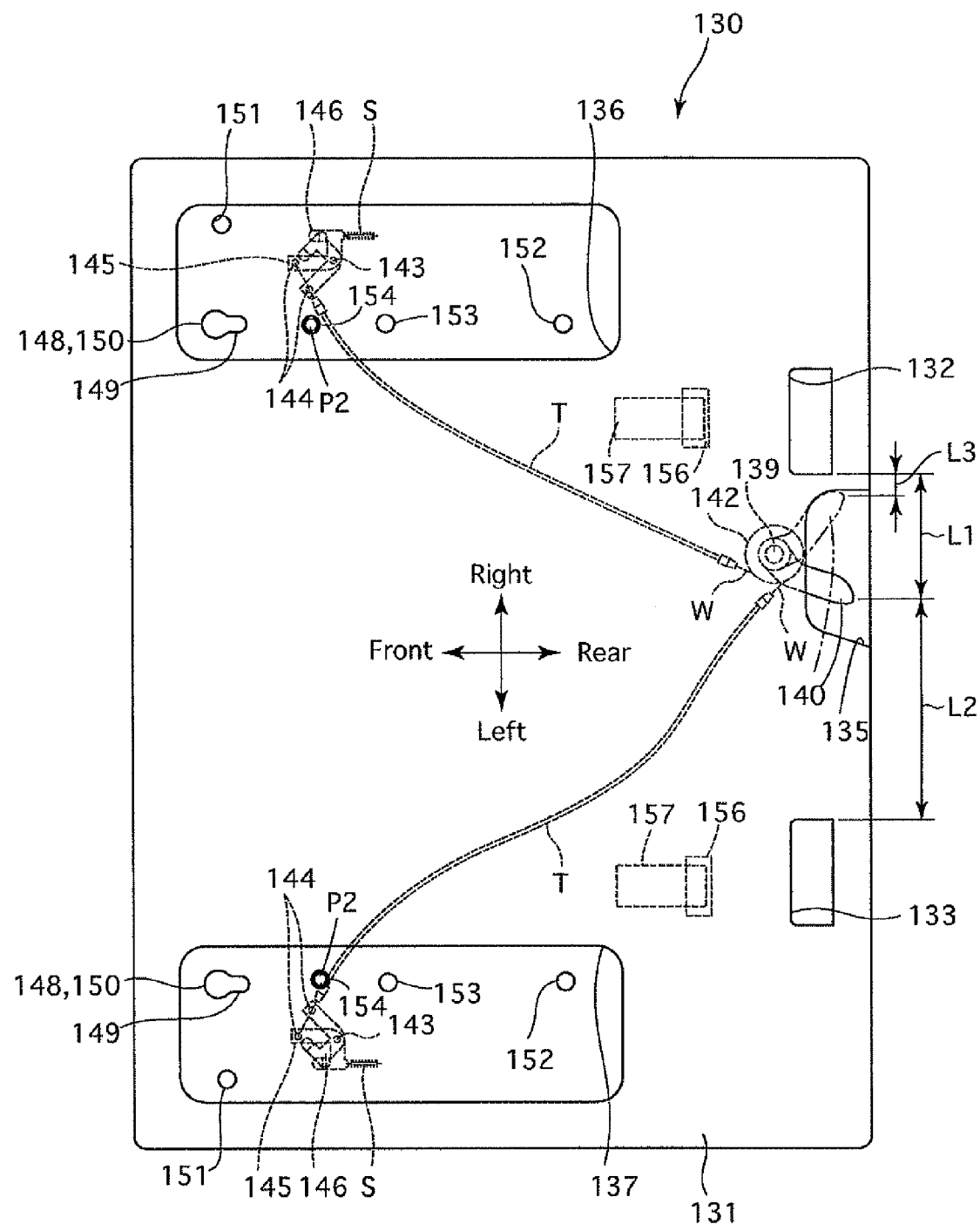
FIG. 9 is a plan view of a slide board unit.
Figure 10:
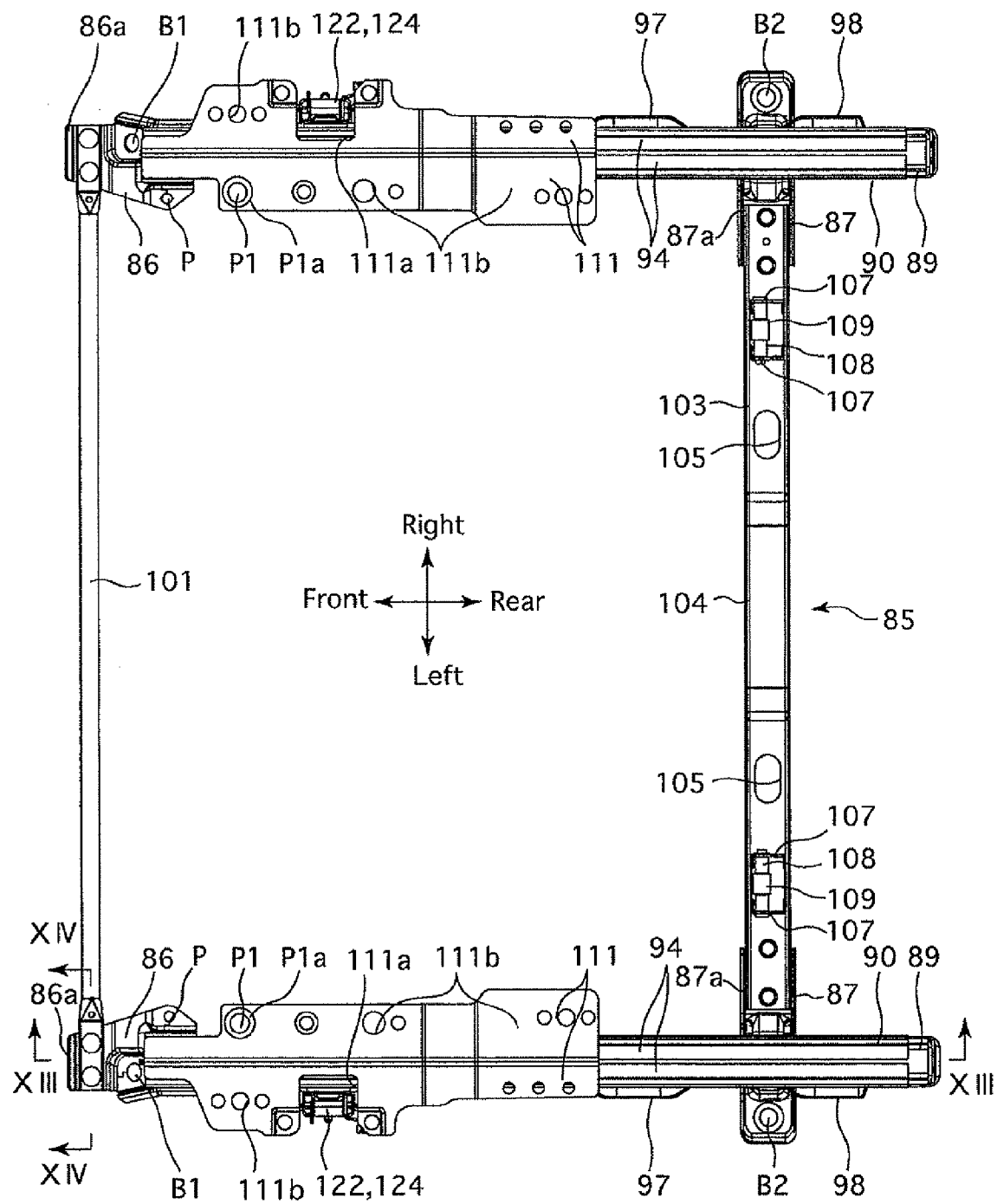
FIG. 10 is a plan view of a rail unit.
Figure 11:
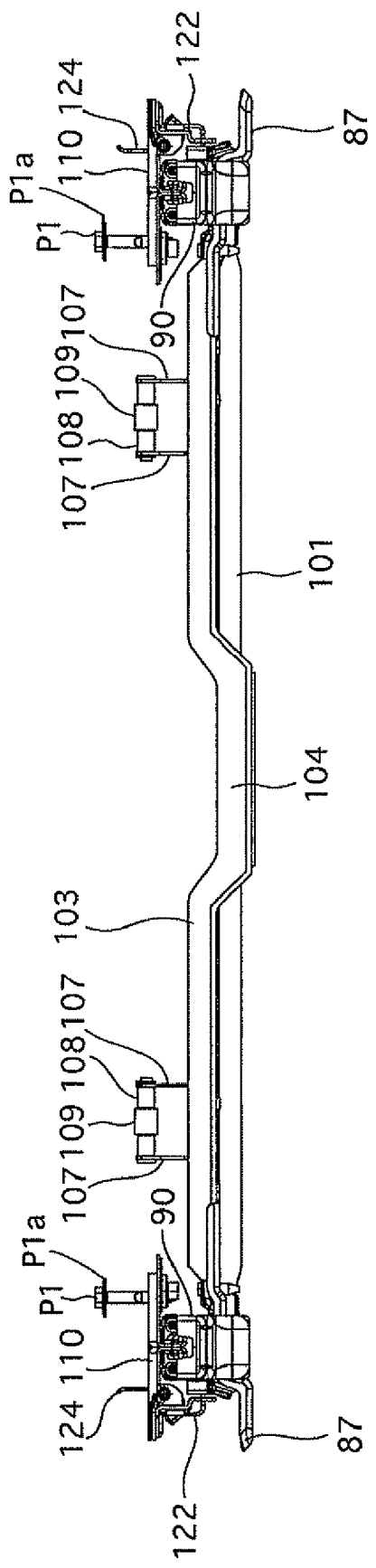
FIG. 11 is a rear view of the rail unit.
Figure 12:
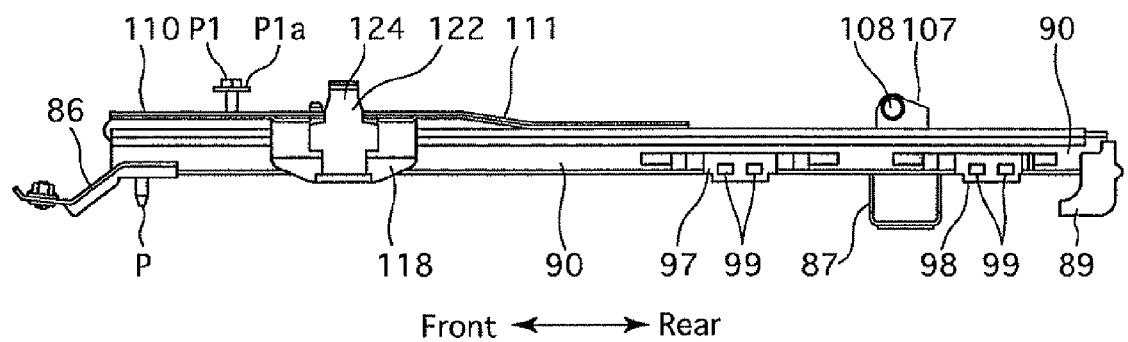
FIG. 12 is a side view of the rail unit.

As shown in FIGS. 9, 19, and 20, a pair of left and right support brackets 156 is fixed near the rear end of the undersurface of the slide deck 131, and a plate spring (a slide deck contact-member) 157 formed of metal (an elastic material) is fixed to each undersurface of the left and right support brackets 156.

The plate spring 157 has a rectangular shape in plan view and includes a fixed end portion 157a that is fixed to the undersurface of the support bracket 156, an elastic deformation portion 157b extending forward from the front end of the fixed end portion 157a and extending obliquely upward, and a holding portion 157c extending substantially horizontally forward from the front end of the elastic deformation portion 157b, and an inclined portion 157d extending obliquely downward from the front end of the holding portion 157c.

The above-described components are constituent elements of the deck unit 130, and the deck unit 130 is previously unitized outside the vehicle 10.

The support bracket 107, the rotation shaft 108, the support roller 109, the support bracket 156, and the plate spring 157 are constituent elements of an uplift prevention mechanism 100 and a rattle prevention mechanism BM2.

Next, the assembling of the deck unit 130 to the rail unit 85 fixed to the bottom plate 15 will be described.

Before assembly, the left and right upper rails 110 are first placed at positions corresponding to any one of the locked members 96, 97, and 98, and the engaging protruding portion 121 of the lock claw 122 is engaged (locked) with the through-holes 120 and the lock holes 99. The large-diameter circular holes 148 of the left and right potbelly holes 150 are located directly above the pin members P1 (the holding members P1a) of the left and right upper rails 100, and the entire slide deck 131 is moved downward while the front end of the slide deck 131 is slightly inclined downward relative to the rear end. Subsequently, the left and right holding members P1a (and the pin members P1) having a smaller diameter than the large-diameter circular hole 148 pass through the large-diameter circular hole 148 to protrude into the attachment recesses 136 and 137, and thereafter, the slide deck 131 is moved forward relative to the upper rail 110 while the inclination of the slide deck 131 is maintained. The left and right holding members P1a then enter into the narrow portions 149 of the left and right potbelly holes 150. The left and right holding members P1a are located directly above the left and right narrow portions 149, and a part of the holding member P1a having a diameter larger than the width of the narrow portion 149 is in contact with the upper surface of the slide deck 131. At this stage, the through-holes H2a, H3a, and H4b provided in the left and right upper rails 110 are respectively located directly below the left and right through-holes 151, 152, and 153. When the rear end of the slide deck 131 is lowered to the same position as the front end to bring the undersurface of the slide deck 131 into contact with the upper surface of the horizontal support piece 111 of each of the left and right upper rails 110, the entire undersurface of the holding member P1a is in contact with the upper surface of each of the attachment recesses 136 and 137, and the through-holes H2a, H3a, and H4b communicably connect with the left and right through-holes 151, 152, and 153, respectively. Moreover, the left and right positioning pins P2 are fitted into the through-holes 154. In this state, three bolts (not shown) are inserted into the through-holes 151, 152, and 153 in the attachment recesses 136 and 137 and respectively screwengage into the nuts 125b and 127c located directly below the through-holes 151, 152, and 153. When the slide deck 131 is fixed to the left and right upper rails 100 in this manner, as shown by the solid line in FIG. 16, the pressing piece 146 of each of the left and right lock switching members 144 (located at the lock allowing position) is located outside the pressed portion 124 of the lock claw 122 (located at the locked position), and thus a space is provided between the pressing piece 146 and the pressed portion 124. Moreover, as shown in FIGS. 19 and 20, the two support rollers 109 of the rail unit 85 are in contact with the undersurface of the slide deck 131.

Finally, the cover plates 155 are fitted into the attachment recesses 136 and 137 resulting in the completion of the deck unit 130, whereby the assembling operation of the deck unit 130 and the rail unit 85 is completed. Subsequently, as shown in FIGS. 19 and 20, the left/right direction position and the upward/downward direction position of the left and right plate springs 157 and the left and right support rollers 109 coincide with each other.

Accordingly, during the assembly of the deck unit 130 to the rail unit 85 including a lock mechanism provided with the lock claw 122, the torsion coil spring, a support piece 59 (the lock claw supporting member 118), and the lock holes 99 (the locked members 96, 97, and 98), the lock claw 122 and the lock switching member 144 (or the operation wire W) are not required to be connected, and therefore, the deck unit 130 can be easily assembled to the rail unit 85.

Next, the operation of the slide deck device SD2 having the above configuration will be described.

When the back opening 11 is closed by the back door 12 of the vehicle 10, the left and right upper rails 110 are located at the position corresponding to the left and right locked members 96, and the engaging protruding portion 121 of each of the left and right lock claws 122 is engaged (locked) with the through-holes 120 of the lock claw supporting member 118 and the lock holes 99 of the locked member 96. Therefore, the slide deck 131 is located at the accommodated position at which the front end surface of the slide deck 131 is located immediately behind the second-row seat 13.

When the slide deck 131 is located at the accommodated position, the front/rear directional position of the holding portion 157c of the plate spring 157 and the front/rear directional position of the support roller 109 coincide with each other, as shown in FIG. 20, therefore, the holding portion 157c and the elastic deformation portion 157b are elastically deformed while the holding portion 157c is in contact with the undersurface of the support roller 109. When the slide deck 131 is located at the accommodated position, the holding portion 157c of the plate spring 157 is in contact with the lower portions of the left and right support rollers 109 while being elastically deformed, and therefore, the slide deck 131 can be prevented from lifting up. Moreover, the left and right support rollers 109 support the undersurface of the slide deck 131, and therefore, even if a load in the vertical direction is applied to the slide deck 131 due to the vehicle 10 being driven, the slide deck 131 does not rattle vertically with respect to the bottom plate 15, and abnormal noise does not occur from the slide deck device SD2.

If the back door 12 is opened, an operator (passenger/driver) can put his/her right hand on the holding recess 132 and can put the left hand on the holding recess 133. However, a distance L1 in the left/right direction from the end (rear end) of the operation member 140 positioned at the initial position to the left side surface of the holding recess 132 is 100 mm or more, and therefore, if the operator puts his/her right hand fingers, other than his/her right hand thumb, on the holding recess 132 before putting his/her right hand thumb on the operation member 140, the operation member 140 cannot be operated by his/her right hand thumb (furthermore, a distance L2 in the left/right direction from the right end surface of the holding recess 133 to the end (rear end) of the operation member 140 positioned at the initial position is 150 mm or more, and therefore, when the operator puts his/her left hand fingers, other than his/her left hand thumb, on the holding recess 133, the operation member 140 cannot be operated by his/her left hand thumb). Therefore, when the operator puts his/her right hand on the holding recess 132, he/she first moves the right hand closer to the operation member 140 from the left side of the operation recess 135 and then moves the right hand on the right side while putting the thumb of the right hand on the operation member 140 to rotate the operation member 140 to the unlocking-operation position. A distance L3 in the left/right direction from the end (rear end) of the operation member 140 that has been moved to the unlocking-operation position toward the left side surface of the holding recess 132 is 60 mm or less, and therefore, if the operation member 140 is rotated to the unlocking-operation position, the operator can put his/her right hand fingers, other than his/her right hand thumb, on the holding recess 132 while holding the operation member 140 in the unlocking-operation position by his/her right hand thumb.

When the operation member 140 which is positioned at the initial position is rotated toward the unlocking-operation position, the rotary pulley 142 rotates to pull the operation wire W, and therefore, the left and right lock switching members 144 located at the lock allowing position are rotated toward the unlocking-operation position. Subsequently, when the lock switching member 144 is rotated toward the unlocking-operation position by a predetermined distance, the pressing piece 146 of the lock switching member 144, which has been previously spaced apart from the lock claw 122 (the pressed portion 124), comes in contact with the pressed portion 124. When the operation member 140 is rotated to the unlocking-operation position so as to rotate the lock switching member 144 to the unlocked position, the left and right lock claws 122 rotate to the unlocked position, and accordingly, the engaging protruding portion 121 of each of the left and right lock claws 122 escapes from the through-holes 120 of the lock claw supporting member 118 and the lock holes 99 of the locked member 96, and thus the locking by the lock claw 122 is released (see the virtual line in FIG. 16).

When the slide deck 131 is drawn rearward while the operation member 140 is held at the unlocking-operation position, the rollers 115 and 116 and the support roller 109 rotate, and consequently, the upper rail 110 and the deck unit 130 can be slid rearward relative to the lower rail 90. When the left and right lock claws 122 are located at the side of the locked member 97, the operator releases the hand from the operation member 140 to rotate and return the operation member 140 to the initial position, whereby the lock switching member 144 rotates and returns to the lock allowing position. Accordingly, the left and right lock claws 122 rotate and return to the locked position so that the engaging protruding portion 121 is engaged (locked) with the through-holes 120 of the lock claw supporting member 118 and the lock holes 99 of the locked member 97, whereby the slide deck 131 can be held at an intermediate position (not shown). When the left and right lock claws 122 are located on the side of the locked member 98, the operator releases the hand from the operation member 140 to rotate and return the operation member 140 to the initial position, whereby the engaging protruding portion 121 of the lock claw 122 is engaged (locked) with the through-holes 120 of the lock claw supporting member 118 and the lock holes 99 of the locked member 98, and therefore, the slide deck 131 can be held at a maximum drawn position (not shown).

As described above, when the slide deck 131 is drawn to the rear of the back opening 11, the left and right plate springs 157 return to their free state and are located behind the left and right support rollers 109, as shown in FIG. 19; therefore, an uplift preventing function of the slide deck 131 using the left and right plate springs 158 is disabled. However, there is no problem even if the lifting up of the slide deck 131 is not prevented in the state that the slide deck 131 is drawn to the rear of the vehicle 10 since the vehicle 10 is not driven in this state.

With the release of the engagement (lock) with the lock holes 99 of the locked member 97 (and the through-holes 120 of the lock claw supporting member 118) or the lock holes 99 of the locked member 98 (and the through-holes 120 of the lock claw supporting member 118) by the lock claw 122, the slide deck 131 is slid forward to the accommodated position, whereby immediately before the slide deck 131 reaches the accommodated position, the inclined portion 157*d*, which is located at the same position in the vertical direction as the support roller 109, moves under the support roller 109 while being elastically deformed (not shown). Thus, when the slide deck 131 reaches the accommodated position, the plate spring 157 is smoothly elastically deformed to the shape shown in FIG. 20 so that the lifting up of the slide deck 131 is prevented by the holding portion 157*c*.

As described above, the rattle prevention mechanism BM2 of the present embodiment can also reliably prevent the lifting up of the slide deck 131 when the slide deck 131 is located at the accommodated position.

Furthermore, since the support roller 109 serves as both the supporting member and the floor contact-member, the number of components can be reduced.

Furthermore, the elastically deformable plate spring 157 was selected as the slide deck contact-member to thereby alleviate the requirement of the mounting position accuracy of the plate spring 157 to the slide deck 131 and the mounting position accuracy of the support bracket 107, which constitutes the supporting member and the floor contact-member, to the floor surface. Accordingly, the mounting operation of the support bracket 107 and the plate spring 157 is simplified.

In the slide deck device SD2 of the present embodiment, when the lock switching member 144 (the pressing piece 146) is positioned at the lock allowing position, the lock switching member 144 moves outwardly away from the lock claw 122 (the pressed portion 124), and therefore, a predetermined amount of play exists between the operation of the operation member 140 and the operation of the lock claw 122. Therefore, since the lock claw 122 is not moved by only a slight movement of the operation member 140, due to luggage or the body of a passenger hitting against the operation member 140, there is less possibility of the lock being unexpectedly released by the lock claw 122.

When the operation member 140 is rotated to the unlocking-operation position in a case such that the vehicle 10 is parked on a sloping road in a state where the rear portion of the vehicle 10 is located lower than the front portion, the slide deck 131 may unexpectedly slide swiftly rearward due to its own load or a load of luggage placed on the upper surface of the slide deck 131. However, in such a case, although the operator reflexively continues to hold the holding recesses 132 and 133 by the left and right hands, since the right hand is opened in the left/right direction (due to the distance, in the left/right direction, between the thumb and the little finger being very large), the operator can reflexively and easily release the thumb from the operation member 140. When the operator releases the thumb from the operation member 140, since the operation member 140 rotates to the initial position that is positioned further from the holding recess 132 than to the unlocking-operation position, thereafter, there is almost no possibility of the thumb of the operator reflexively operating the operation member 140. Thus, in the above case, the lock claw 122 located at the unlocked position rotates to the locked position, and therefore, when the lock craw 122 is located at the position corresponding to the locked member 97, the engaging protruding portion 121 of the lock claw 122 is automatically engaged (locked) with the through-holes 120 of the lock claw supporting member 118 and the lock holes 99 of the locked member 97. Thus, in the slide deck device SD2 of the present embodiment, it is highly unlikely that the deck unit 130 moves beyond the intermediate position to slide to the maximum drawn position at once.

If the rail unit 85 is previously assembled so that the support roller 109 (and the support bracket 107) is at a predetermined position and direction relative to the rear connecting member 103, the support roller 109 is at the predetermined position and direction relative to the bottom plate 15 upon the bottom plate 15 being mounted to the rail unit 85. When the bottom plate 15 is mounted to the slide deck device SD2, it is unnecessary to adjust the position and direction of the support roller 109 relative to the bottom plate 15, and therefore, the slide deck device SD2 can be easily mounted to the bottom plate 15. Furthermore, by virtue of the two support rollers 109, it is possible to reliably prevent bending of both sides of the central portion of the slide deck 131, and the slide deck 131 can be smoothly slid by the support roller 109.

Furthermore, the load supporting portion 104 of the undersurface of the rear connecting member 103, which supports the support roller 109, is in contact with the bottom plate 15, and therefore, even if heavy luggage is put on the slide deck 131 the central portion of the rear connecting member 103 is not significantly bent. Thus, even if a heavy luggage is put on the slide deck 131, the undersurface of the slide deck 131 can be stably supported by the support roller 109.

Furthermore, since the load supporting portion 104 is not required to be fixed to the bottom plate 15 by screws or the like, the attachment operation of the rail unit 85 to the bottom plate 15 does not become complex.

Since the rear bracket 87, which is a member used for fixing the left and right lower rails 90 to the bottom plate 15, is utilized as a member for fixing the rear connecting member 103 to the lower rail 90, the number of components can be reduced compared with a case where a bracket for the rear connecting member 103 is separately provided.

Furthermore, if the both ends of the rear connecting member 103 are fixed to the lower rail 90 or a bracket fixed to the lower rail 90 (the bracket is not in contact with the bottom plate 15) and a load of heavy luggage placed on the slide deck 131 is transferred to the lower rail 90, the left and right lower rails 90 deform, resulting in a possibility of unsmooth sliding operation of the upper rail 110. However, since both ends of the rear connecting member 103 are fixed to the rear bracket 87 that is in contact with the bottom plate 15, the load applied to the slide deck 131 is transferred to the bottom plate 15 via the support roller 109, the rotation shaft 108, the support bracket 107, the rear connecting member 103, and the rear bracket 87, but is not transferred to the lower rail 90. Thus, even if heavy luggage is placed on the slide deck 131, an unsmooth sliding operation of the upper rail 110 never occurs.

Furthermore, a space between the cover member 94 of the lower rail 90 and the upper rail 110 is narrow (see, FIGS. 10, 11, and 14); therefore, even if a passenger drops a small object in a state where the upper surface of the lower rail 90 is exposed upward by pulling out the slide deck 131 rearward, it is highly unlikely that the object enters into the lower rail 90 from the space between the cover member 94 and the upper rail 110. Furthermore, in the remote chance of an object entering into the lower rail 90 from the space between the cover member 94 and the upper rail 110, the slide deck 131 is slid to the accommodated position (the front end position), whereby the roller 115 presses the object forward. When the slide deck 131 reaches the accommodated position, the object is lifted obliquely forward and upward by the taper surface of the head portion of the front-end stopper member B3 to be ejected to the front of the lower rail 90 from the front end opening of the lower rail 90, whereby the passenger can easily take out the object from the inside of the lower rail 90.

Although the present invention has been described based on the above embodiments, the invention can be implemented in various modified ways.

For example, in the first embodiment, the number of the cover members 52 (the cushion members 47) and the support rollers 30 may be changed. For example, as shown in FIG. 21, a pair of left and right brackets 67 having an L-shaped cross-section is fixed to the central portion, in the left/right direction, of the bottom plate 15; the cushion member 47 and the cover member 52 are mounted to the supporting member 41 (not shown in FIG. 21) of each bracket 67; and the pair of left and right support brackets 25 are fixed at locations on both the left and right sides of the bracket 67, and the support rollers 30 are rotatably supported by each pair of left and right support brackets 25.

Figure 22:
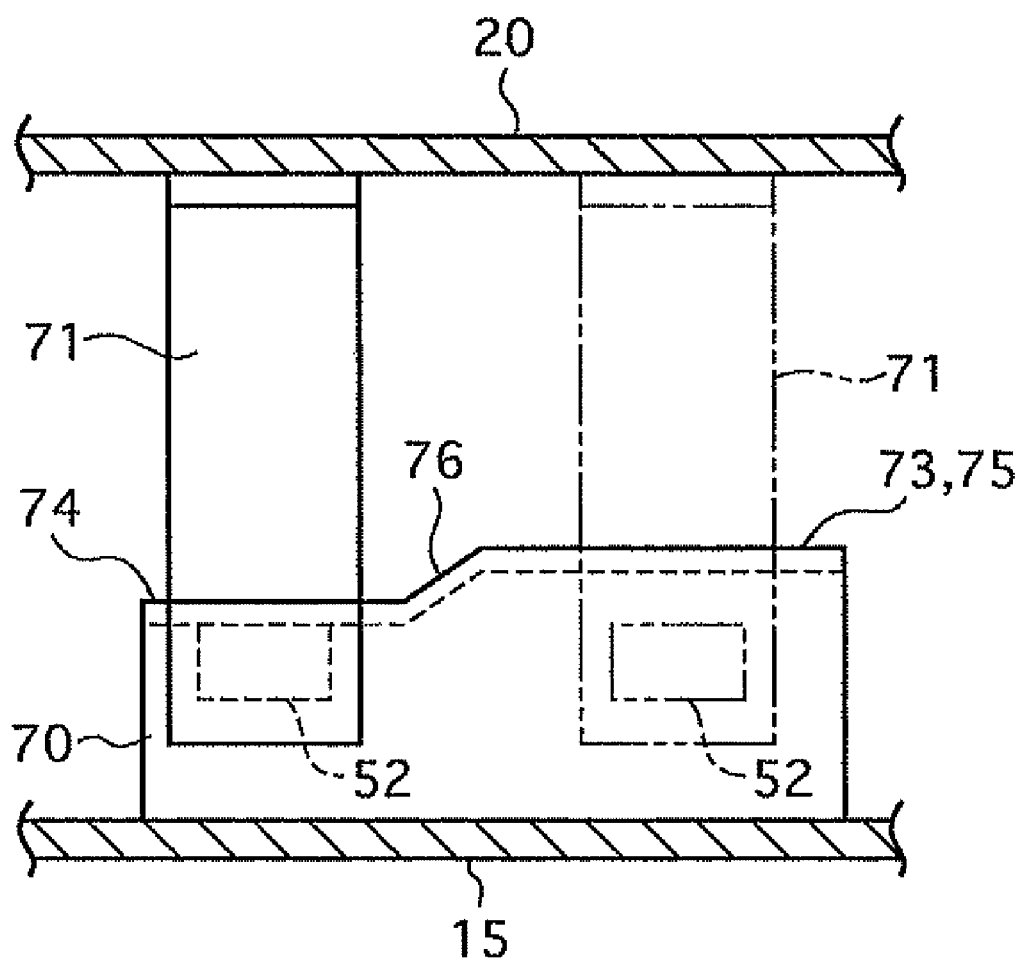
FIG. 22 is a cross-sectional view, similar to FIG. 5, of another modification of the first embodiment.

In the first embodiment, as shown in FIG. 22 (the support roller 30 and the brackets are not shown), a contact member(s) (floor contact-member(s)) 70 having a shape similar to that of the contact member(s) 60 can be fixed onto the bottom plate 15, and the cushion member(s) (the slide deck contact-member) 47 and the cover member(s) (the slide deck contact-member) 52 can be fixed onto the undersurface of the slide deck 20 via a bracket(s) 71 (the supporting member 41 and the cushion member 47 are not shown). In this case, as illustrated in the drawings, a substantially horizontal contact portion 74 (corresponding to the contact portion 64) is provided at the front portion of an upper piece 73 (corresponding to the lower portion piece 63 of the contact member 60) of each contact member 70, a substantially horizontal noncontact portion 75 (corresponding to the noncontact portion 65) positioned at a position one step higher than the contact portion 74 is provided at the rear portion of the upper piece 73, and the rear end of the contact portion 74 and the front end of the noncontact portion 75 are connected by an inclined pressing portion 76 inclining relative to the horizontal direction (as shown by the virtual line in FIG. 22, when the slide deck 20 is located more rearward than the accommodated position, the inclined pressing portion 76 faces the front edge portion of the upper piece 53 of the cover member 52 in the front/rear direction). According to this configuration, when the slide deck 20 is located at the accommodated position, the upper surface of the cover member 52 is in contact with the undersurface of the contact portion 74, and therefore, vertical rattle of the slide deck 20 can be prevented. Whereas, when the slide deck 20 is drawn rearward from the accommodated position, a space is provided between the cover member 52 and the noncontact portion 75 as shown by the virtual line, and therefore, the cover member 52 and the noncontact portion 75 are not in contact with each other. When the slide deck 20 that has been drawn to the rear of the vehicle 10 is slid forward, the inclined pressing portion 76 is in contact with the front edge portion of the upper piece 53 of the cover member 52 immediately before the slide deck 20 reaches the accommodated position, and the upper piece 53 slightly moves downward. Thus, also in this variation, the slide deck 20 that has been drawn to the rear of the vehicle 10 can be smoothly slid to the accommodated position.

If the position of the undersurface of a member (corresponding to the cover member 52 and the cushion member 47 of the above embodiment) that is in contact with the contact portion 64 of the contact member 60 (or the contact portion 74 of the contact member 70) and the position of the upper surface of the contact portion 64 (the contact portion 74) exactly coincide with each other, the member in contact with the contact portion 64 (the contact portion 74) may be formed of an inelastic material.

Furthermore, an elastically deformable cushion member is fixed to a contact portion of the contact member 60 that is in contact with the floor contact-member, and the surface of the cushion member (a surface facing the floor contact-member) may be covered by a cover member. Moreover, a contact portion of the contact member 70 that is in contact with the slide deck contact-member may be configured in a similar manner. In such variations, the floor contact-member that is in contact with the contact member 60 and the slide deck contact-member that is in contact with the contact member 70 may be made from either a member having elasticity or a hard member without elasticity.

On the other hand, in the second embodiment, if different fixing members from the support brackets 107 are fixed to the bottom plate 15, and when the slide deck 131 is located at the accommodated position, the holding portion 157c of the plate spring 157 can be in contact with the undersurface of a portion spacing upward from the bottom plate 15 of the fixing member.

Furthermore, in the second embodiment, a single plate spring 157 can be provided with the support bracket 107, the rotation shaft 108, and the support roller 109 being provided as a set. Alternatively, when the support bracket 107, the rotation shaft 108, and the support roller 109 are provided as three or more sets, and three or more plate springs 157 can be provided.

Furthermore, the plate spring 157 may be formed of an elastic material (for example, a resin material) other than metal, and/or the rear portion of the plate spring 157 may be fixed directly onto the undersurface of the slide deck 131. Furthermore, the intermediate portion, in the longitudinal direction, of the plate spring 157 may be fixed to the undersurface of the support bracket 156 or the undersurface of the slide deck 131.

In any of the embodiments, a member supporting the undersurfaces of the slide decks 20 and 131 may be simply utilized (without rotating) as a supporting member that supports the undersurfaces of the slide decks 20 and 131 instead of the support rollers 30 and 109.

INDUSTRIAL APPLICABILITY

The present invention can be applied to a luggage compartment of a vehicle including a back door. The application of the invention can prevent a vertical rattle of a slide deck when the slide deck is located at the accommodated position.

The invention claimed is:
1. A slide deck device for a vehicle, comprising:
a slide deck which is slidably supported in a front/rear direction on a floor surface of a luggage compartment of a vehicle that includes a back door and can be drawn to the rear of the vehicle from a accommodated position, at which the slide deck is completely accommodated, in the luggage compartment;

a supporting member provided on the floor surface, or provided on a fixing member on the floor surface, and supporting the undersurface of the slide deck;

a floor contact-member provided on the floor surface or provided on the fixing member on the floor surface; and a slide deck contact-member, provided on the undersurface of the slide deck, which is in contact with the undersurface of the floor contact-member when the slide deck is located at the accommodated position, and which is not in contact with the undersurface of the floor contact-member when the slide deck is located more rearward than the accommodated position and wherein at least one of the floor-contact member and the slide deck contact-member is elastic, and wherein one of the floor contact-member and a slide deck contact-member comprises:

a cushion member which can be elastically deformed in a vertical direction; and a cover member which covers a surface of the cushion member that faces the other member, and when the slide deck is located at the accommodated position, the other of the floor contact-member and the slide deck contact-member is in contact with the cover member to compress the cushion member in a vertical direction.

2. The slide deck device for a vehicle according to claim 1, wherein a support bracket supporting the supporting member is provided on the floor surface, and the cushion member is supported by the support bracket.

3. The slide deck device for a vehicle according to claim 1, wherein said other of the floor contact-member and the slide deck contact-member comprises:

a noncontact portion which separates from the cover member in a vertical direction when the slide deck is located more rearward than the accommodated position, whereby said other of the floor contact-member and the slide deck contact-member faces the cover member in a vertical direction;

an inclined pressing portion which extends in a direction inclining relative to the horizontal direction from the end in a sliding direction of the noncontact portion, and, when the slide deck is located more rearward than the accommodated position, faces the cover member in a front/rear direction, and a contact portion which connects to the end of the inclined pressing portion on the opposite side to that of the noncontact portion, and when the slide deck is located at the accommodated position, the contact portion is in contact with the cover member so as to move the cover member in a direction such that the cushion member is compressed compared to when the cover member faces the noncontact portion in the vertical direction.

4. A slide deck device for a vehicle, comprising:

a slide deck which is slidably supported in a front/rear direction on a floor surface of a luggage compartment of a vehicle that includes a back door and can be drawn to the rear of the vehicle from a accommodated position, at which the slide deck is completely accommodated, in the luggage compartment;

a supporting member provided on the floor surface, or provided on a fixing member on the floor surface, and supporting the undersurface of the slide deck;

a floor contact-member provided on the floor surface or provided on the fixing member on the floor surface; and a slide deck contact-member, provided on the undersurface of the slide deck, which is in contact with the undersurface of the floor contact-member when the slide deck is located at the accommodated position, and which is not in contact with the undersurface of the floor contact-member when the slide deck is located more rearward than the accommodated position and wherein at least one of the floor-contact member and the slide deck contact-member is elastic, and wherein the supporting member serves as the floor contact-member, and wherein the slide deck contact-member is a plate spring which is supported so that the intermediate portion or the rear portion thereof is supported like a cantilever by a member fixed to the undersurface of the slide deck, or the undersurface of the slide deck, and is in contact with the floor contact-member when the slide deck is located at the accommodated position.

5. The slide deck device for a vehicle according to claim 4, wherein the plate spring comprises:

an inclined portion which extends in a direction inclining relative to the horizontal direction and, when the slide deck is located more rearward than the accommodated position, is located behind the supporting member at the same position, in the vertical direction, as that of the supporting member, and a holding portion which is connected to the rear end of the inclined portion and, when the slide deck is located at the accommodated position, is in contact with the undersurface of the supporting member.

6. The slide deck device for a vehicle according to claim 4, wherein the supporting member is a support roller which can rotate about a rotation shaft extending in a vehicle width direction and supports the undersurface of the slide deck.

* * * * *